US012615650B2

(12) United States Patent (10) Patent No.: US 12,615,650 B2
Guo et al. (45) Date of Patent: Apr. 28, 2026

(54) RESOURCE ALLOCATION FOR SIDELINK FULL DUPLEX COMMUNICATIONS

(71) Applicant: QUALCOMM Incorporated, San Diego, CA (US)

(72) Inventors: Hui Guo, Beijing (CN); Kapil Gulati, Belle Mead, NJ (US); Navid Abedini, Basking Ridge, NJ (US); Shuanshuan Wu, San Diego, CA (US); Junyi Li, Fairless Hills, PA (US); Sourjya Dutta, San Diego, CA (US); Anantharaman Balasubramanian, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 18/252,700

(22) PCT Filed: Jan. 28, 2021

(86) PCT No.: PCT/CN2021/074225
§ 371 (c)(1),
(2) Date: May 11, 2023

(87) PCT Pub. No.: WO2022/160204
PCT Pub. Date: Aug. 4, 2022

(65) Prior Publication Data
US 2024/0015771 A1 Jan. 11, 2024

(51) Int. Cl.
*H04W 72/40* (2023.01)
*H04L 5/14* (2006.01)
(Continued)

(52) U.S. Cl.
CPC ............... *H04W 72/40* (2023.01); *H04L 5/14* (2013.01); *H04W 72/12* (2013.01); *H04W 72/541* (2023.01)

(58) Field of Classification Search
CPC ... H04W 72/40; H04W 72/541; H04W 72/12; H04W 72/20; H04W 72/121;
(Continued)

(56) References Cited

U.S. PATENT DOCUMENTS

2016/0127114 A1 5/2016 Kim et al.
2019/0260485 A1 8/2019 Byun et al.
(Continued)

FOREIGN PATENT DOCUMENTS

WO WO-2020091539 A1 5/2020

OTHER PUBLICATIONS

International Search Report and Written Opinion—PCT/CN2021/074225—ISA/EPO—Aug. 9, 2021.

*Primary Examiner* — Rushil P. Sampat
(74) *Attorney, Agent, or Firm* — Holland & Hart LLP

(57) ABSTRACT

Methods, systems, and devices for wireless communications are described. Generally, the described techniques provide for a user equipment (UE) to measure self-interference between multiple transmission reception points (TRPs) of the UE and initiate sidelink full duplex communications based on the measured self-interference. The UE may transmit a message to a base station to request resources for sidelink communications by the UE and indicate an intended self-interference measurement by the UE using the resources. The base station may transmit a grant scheduling the resources for the self-interference measurement by the UE. The UE may measure interference between a TRP of the UE that is configured for transmission and a TRP of the UE that is configured for reception using the scheduled
(Continued)

400 resources. The UE may transmit a sidelink feedback message indicating resources that are available for sidelink full duplex communications by the UE based on the measured self-interference.

30 Claims, 17 Drawing Sheets

(51) Int. Cl.
*H04W 72/12* (2023.01)
*H04W 72/541* (2023.01)

(58) Field of Classification Search
CPC ......... H04W 72/1268; H04W 72/1273; H04W 72/1284; H04W 72/1289; H04W 72/21; H04W 72/23; H04W 92/18; H04L 5/14
See application file for complete search history.

(56) References Cited

U.S. PATENT DOCUMENTS

| | | | |
|---|---|---|---|
| 2020/0008230 A1 | 1/2020 | Yu et al. | |
| 2020/0170023 A1* | 5/2020 | Kim ..................... | H04W 72/20 |
| 2020/0178221 A1 | 6/2020 | Byun et al. | |
| 2020/0220585 A1 | 7/2020 | John Wilson et al. | |
| 2020/0228196 A1 | 7/2020 | John Wilson et al. | |
| 2020/0229195 A1* | 7/2020 | Lien ....................... | H04L 5/001 |
| 2023/0262833 A1* | 8/2023 | Keshavamurthy .... | H04W 76/28 |
| | | | 370/329 |

* cited by examiner 105-a

225

BSR

Sidelink
Grant

215

220

230

115-a 205-b 205-a

Self-Interference

210

200

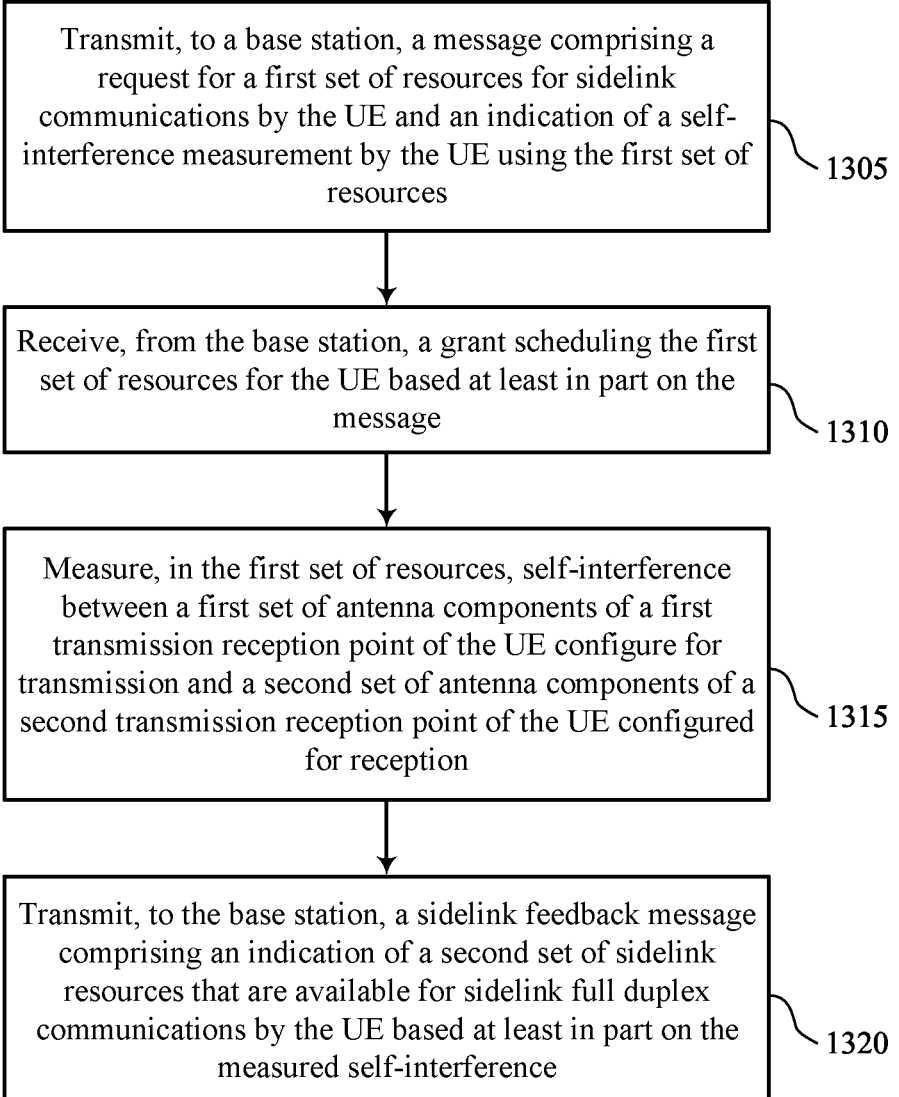

Transmit, to a base station, a message comprising a request for a first set of resources for sidelink communications by the UE and an indication of a self-interference measurement by the UE using the first set of resources
⌐ 1305

Receive, from the base station, a grant scheduling the first set of resources for the UE based at least in part on the message
⌐ 1310

Measure, in the first set of resources, self-interference between a first set of antenna components of a first transmission reception point of the UE configure for transmission and a second set of antenna components of a second transmission reception point of the UE configured for reception
⌐ 1315

Transmit, to the base station, a sidelink feedback message comprising an indication of a second set of sidelink resources that are available for sidelink full duplex communications by the UE based at least in part on the measured self-interference
⌐ 1320

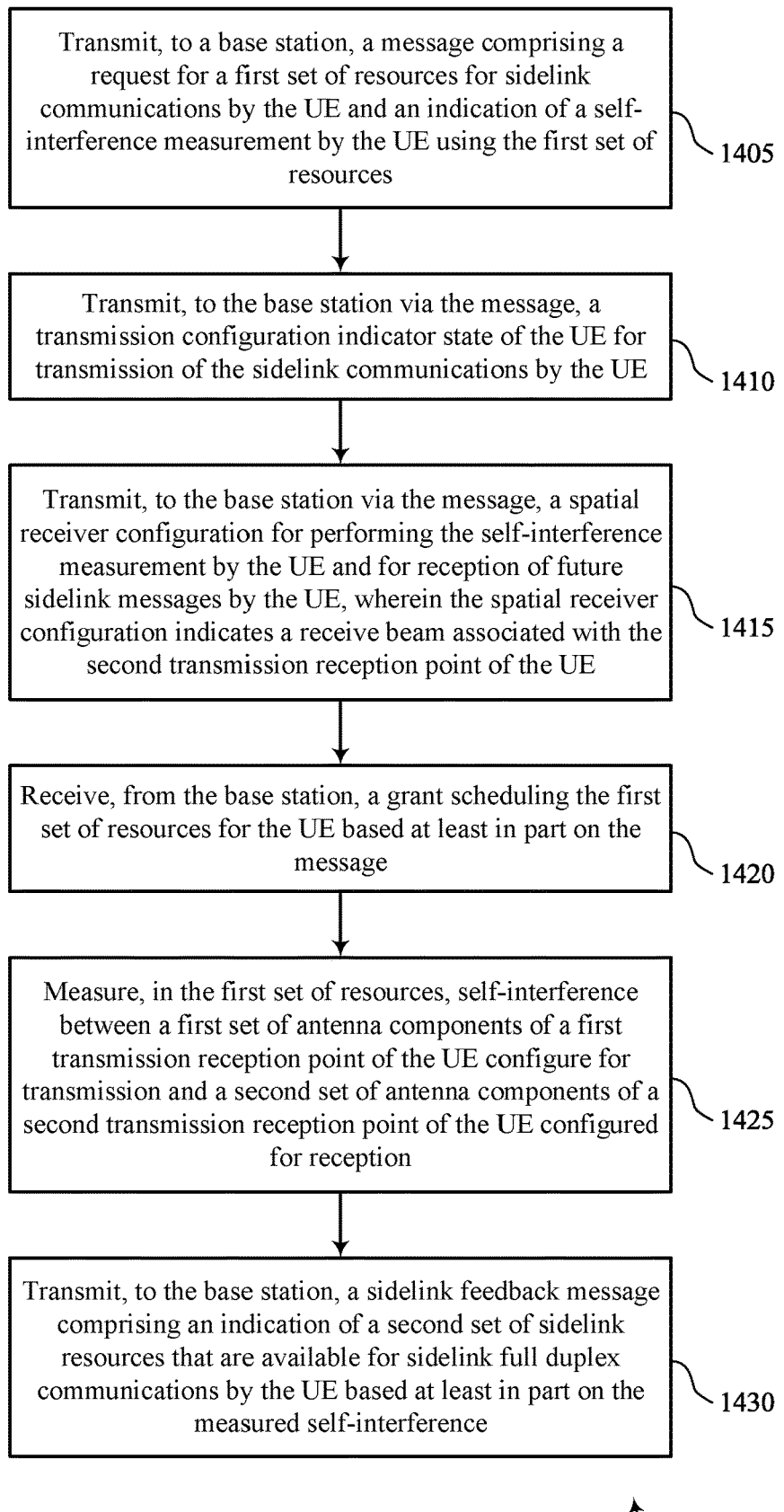

Transmit, to a base station, a message comprising a request for a first set of resources for sidelink communications by the UE and an indication of a self-interference measurement by the UE using the first set of resources ⟍ 1405

Transmit, to the base station via the message, a transmission configuration indicator state of the UE for transmission of the sidelink communications by the UE ⟍ 1410

Transmit, to the base station via the message, a spatial receiver configuration for performing the self-interference measurement by the UE and for reception of future sidelink messages by the UE, wherein the spatial receiver configuration indicates a receive beam associated with the second transmission reception point of the UE ⟍ 1415

Receive, from the base station, a grant scheduling the first set of resources for the UE based at least in part on the message ⟍ 1420

Measure, in the first set of resources, self-interference between a first set of antenna components of a first transmission reception point of the UE configure for transmission and a second set of antenna components of a second transmission reception point of the UE configured for reception ⟍ 1425

Transmit, to the base station, a sidelink feedback message comprising an indication of a second set of sidelink resources that are available for sidelink full duplex communications by the UE based at least in part on the measured self-interference ⟍ 1430

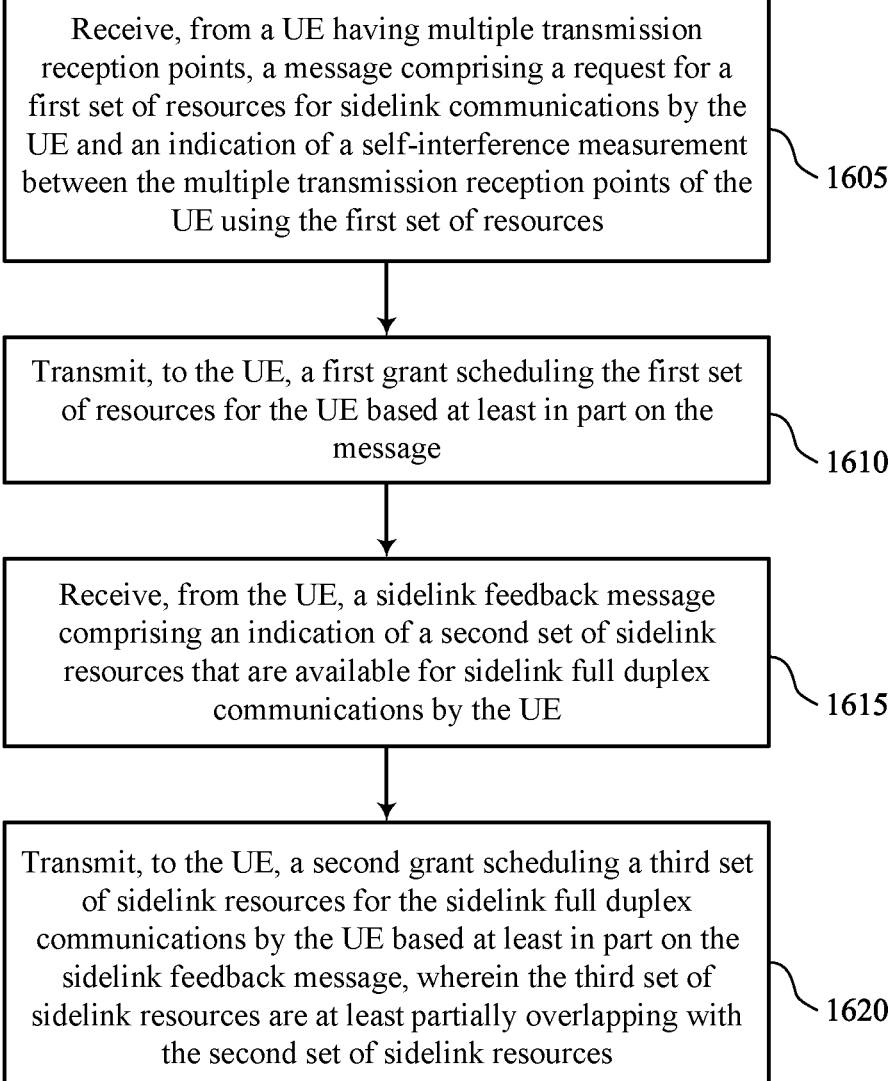

Receive, from a UE having multiple transmission reception points, a message comprising a request for a first set of resources for sidelink communications by the UE and an indication of a self-interference measurement between the multiple transmission reception points of the UE using the first set of resources

1605

Transmit, to the UE, a first grant scheduling the first set of resources for the UE based at least in part on the message

1610

Receive, from the UE, a sidelink feedback message comprising an indication of a second set of sidelink resources that are available for sidelink full duplex communications by the UE

1615

Transmit, to the UE, a second grant scheduling a third set of sidelink resources for the sidelink full duplex communications by the UE based at least in part on the sidelink feedback message, wherein the third set of sidelink resources are at least partially overlapping with the second set of sidelink resources

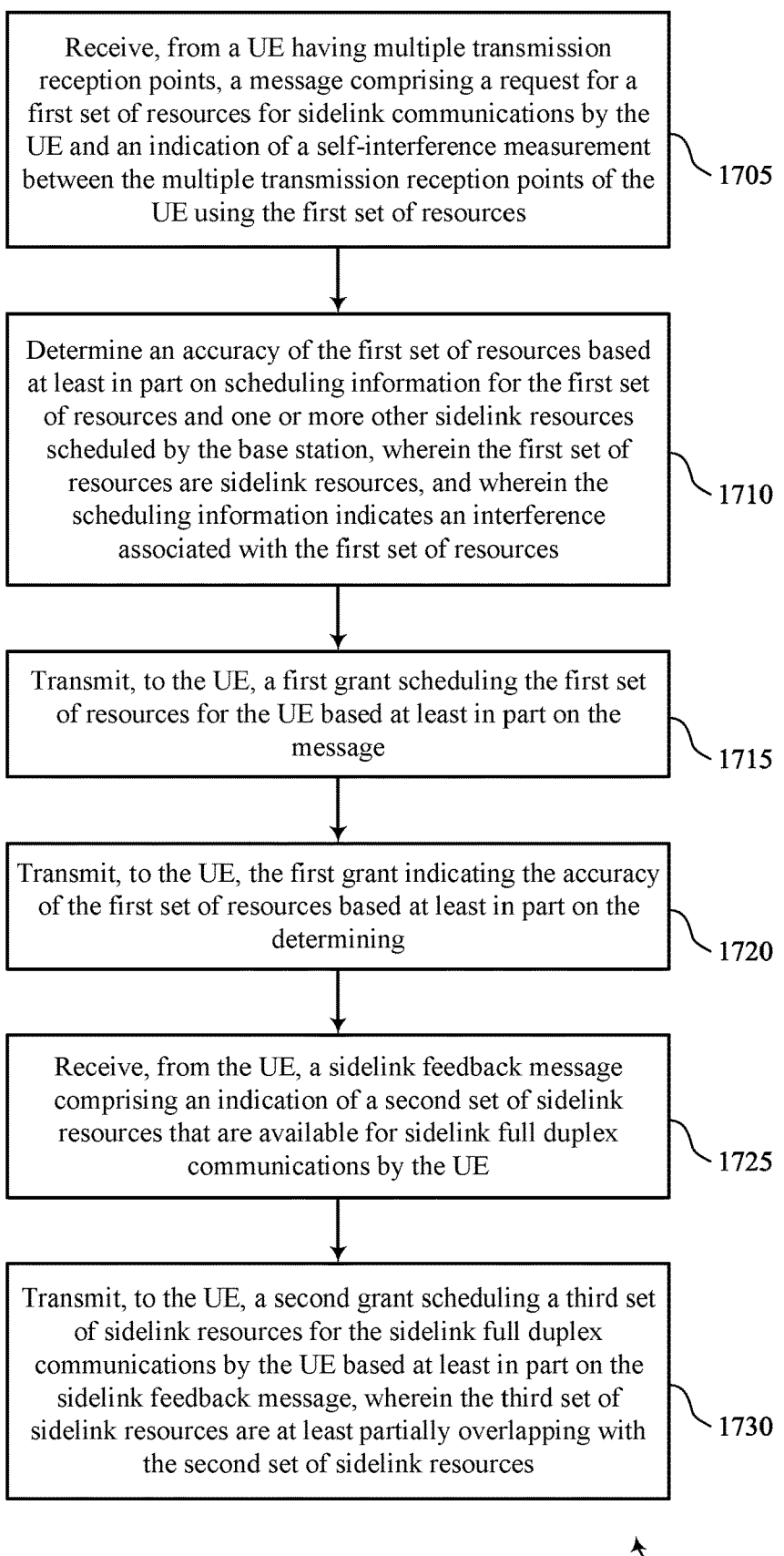

Receive, from a UE having multiple transmission reception points, a message comprising a request for a first set of resources for sidelink communications by the UE and an indication of a self-interference measurement between the multiple transmission reception points of the UE using the first set of resources

1705

Determine an accuracy of the first set of resources based at least in part on scheduling information for the first set of resources and one or more other sidelink resources scheduled by the base station, wherein the first set of resources are sidelink resources, and wherein the scheduling information indicates an interference associated with the first set of resources

1710

Transmit, to the UE, a first grant scheduling the first set of resources for the UE based at least in part on the message

1715

Transmit, to the UE, the first grant indicating the accuracy of the first set of resources based at least in part on the determining

1720

Receive, from the UE, a sidelink feedback message comprising an indication of a second set of sidelink resources that are available for sidelink full duplex communications by the UE

1725

Transmit, to the UE, a second grant scheduling a third set of sidelink resources for the sidelink full duplex communications by the UE based at least in part on the sidelink feedback message, wherein the third set of sidelink resources are at least partially overlapping with the second set of sidelink resources

RESOURCE ALLOCATION FOR SIDELINK FULL DUPLEX COMMUNICATIONS

CROSS REFERENCE

The present Application is a 371 national stage filing of International PCT Application No. PCT/CN2021/074225 by GUO et al. entitled "RESOURCE ALLOCATION FOR SIDELINK FULL DUPLEX COMMUNICATIONS," filed Jan. 28, 2021, which is assigned to the assignee hereof, and which is expressly incorporated by reference in its entirety herein.

FIELD OF TECHNOLOGY

The following relates to wireless communications, including resource allocation for sidelink full duplex communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a wireless device, such as a UE, may include multiple transmission reception points (TRPs). The UE may perform full duplex communications using two or more of the multiple TRPs, which may result in self-interference between the TRPs of the multi-TRP (mTRP UE). In some examples, a base station may schedule full duplex resources for a mTRP UE, and the scheduled resources for full duplex communications by the UE may result in relatively high self-interference at the UE.

SUMMARY

The described techniques relate to improved methods, systems, devices, and apparatuses that support resource allocation for sidelink full duplex communications. Generally, the described techniques provide for a user equipment (UE) to measure self-interference between multiple transmission reception points (TRPs) of the UE and initiate sidelink full duplex communications based on the measured self-interference. The UE may include one or more TRPs that may each include multiple antenna components. In some examples, the UE may operate in a sidelink resource allocation mode (e.g., Mode 1) in which a base station schedules resources for sidelink communications by the UE. The UE may transmit a message (e.g., a scheduling request (SR) or buffer status report (BSR)) to the base station to request resources for sidelink communications by the UE. The message may include an indication of a self-interference measurement by the UE using the requested resources. The base station may transmit a grant scheduling resources for the self-interference measurement by the UE. The UE may measure interference between a first set of antenna components of a first TRP of the UE that is configured for transmission and a second set of antenna components of a second TRP of the UE that is configured for reception using the scheduled resources. The UE may determine resources that are available for sidelink full duplex communications (e.g., with relatively low self-interference) by the UE based on the measured self-interference. The UE may transmit a sidelink feedback message indicating the resources that are available for sidelink full duplex communications by the UE to the base station. The base station may transmit a sidelink grant that schedules sidelink resources for full duplex communications by the UE based on the sidelink feedback message. Accordingly, the base station may schedule full duplex communications by the UE in time and frequency resources in which the UE is capable of performing sidelink full duplex communications with reduced self-interference.

BRIEF DESCRIPTION OF THE DRAWINGS

FIGS. 13 through 17 show flowcharts illustrating methods that support resource allocation for sidelink full duplex communications in accordance with aspects of the present disclosure.

DETAILED DESCRIPTION

Figure 1:
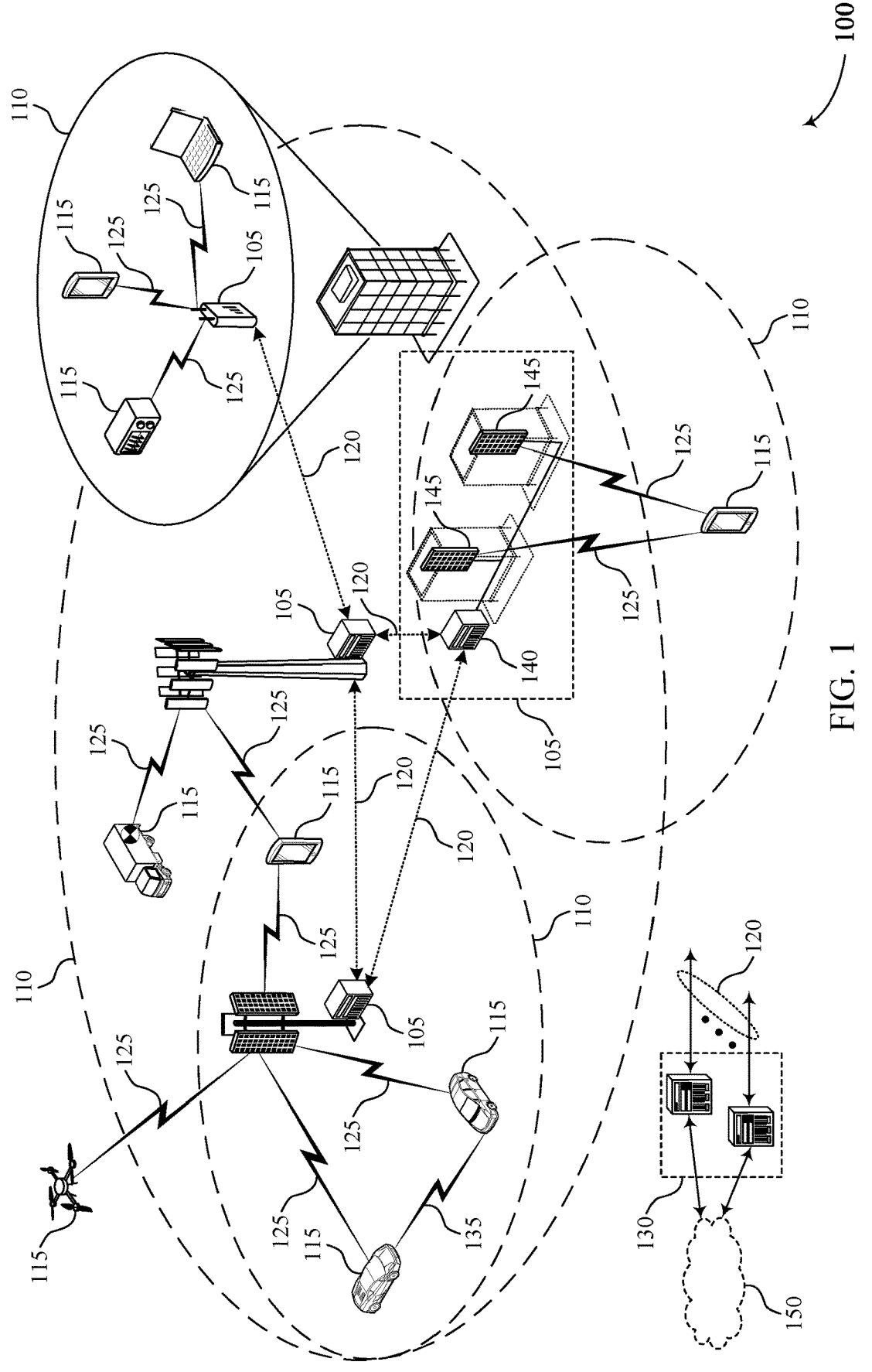
FIG. 1 illustrates an example of a wireless communications system that supports resource allocation for sidelink full duplex communications in accordance with aspects of the present disclosure.

In some wireless communication systems, a user equipment (UE) may include multiple transmission reception points (TRPs) (e.g., a multi-TRP (mTRP) UE), and each TRP may include a set of antenna components for communications by the UE. The UE may support full duplex communications using the multiple TRPs. For example, the UE may transmit messages via a TRP that is configured for transmission and may receive messages via a TRP that is configured for reception. As such, the UE may transmit and receive messages concurrently via the same radio resources using two or more TRPs, and may be referred to as a full duplex capable UE if full duplex operations are supported by one or more of the TRPs or if two or more of the TRPs are configured for half duplex mode in the same radio resources (e.g., configured for communications in different communication directions such as transmit or receive). In some examples, the UE may experience self-interference between the TRPs (e.g., between a transmit panel and a receive panel) during full duplex communications. The UE may switch from full duplex communications to half-duplex communications to reduce self-interference.

In some cases (e.g., during sidelink resource allocation Mode 1), a base station may schedule sidelink resources for communications between sidelink UEs, which may or may not be mTRP full duplex capable UEs. The UEs may transmit scheduling request (SR) or buffer status report (BSR) messages to the base station to request resources for sidelink communications. The base station may not know an intended operating mode (e.g., full duplex or half-duplex) for each respective UE, and the base station may schedule sidelink resources for full duplex communications by a UE, which may result in interference. Additionally or alternatively, the base station may schedule resources for a transmission to an mTRP UE, but the base station may be unaware of the intended destination of the sidelink transmission (e.g., an identifier (ID) of the mTRP UE that may receive the communications). The base station may thereby configure resources for a transmission to the mTRP UE on resources in a same slot as resources that are configured for a transmission by the mTRP UE, which may result in high interference at the mTRP UE.

As described herein, a UE (e.g., a mTRP UE) may transmit a message (e.g., an SR message, a BSR, or the like), to a base station to request resources for sidelink communications and to indicate that the UE will perform self-interference measurement for the requested resources. The base station may identify available resources and transmit a grant scheduling the available resources for the UE to perform self-interference measurement. The UE may measure self-interference using the resources to determine when to initiate full duplex communications without incurring significant interference between TRPs of the UE. To perform the self-interference measurement, the UE may transmit signaling in the scheduled resources, and the UE may measure interference between a TRP that is configured for transmission and a TRP that is configured for reception. The UE may transmit a sidelink feedback message to the base station indicating available resources, receive beams, or both (e.g., a receiver configuration) for sidelink full duplex communications by the UE (e.g., with relatively low self-interference). The base station may schedule sidelink resources for transmissions by the UE and reception at the UE accordingly.

The resources for performing self-interference measurement by the UE may be sidelink resources (e.g., resources within a physical sidelink shared channel (PSSCH) or a physical sidelink control channel (PSCCH)) or channel state information (CSI) reference signal (CSI-RS) resources for beam management operations that may be re-allocated for self-interference measurement. In some examples, the first UE may transmit an indication of a transmission configuration indicator (TCI) state of the UE for performing sidelink transmissions, a receiver configuration (e.g., a spatial configuration corresponding to a receive beam used by a TRP of the UE that is configured for reception) for receiving future sidelink communications or performing the self-interference measurement, an intended time occasion for performing the self-interference measurement, or a combination thereof, via the BSR to the base station. The base station may identify and schedule available resources for the self-interference measurement based on the information received from the UE.

Aspects of the present disclosure may be implemented to realize one or more of the following potential advantages or improvements, among others. The present disclosure may provide benefits and enhancements to the operation of a sidelink UE. For example, operations performed by the UE may provide for improved quality and reliability of sidelink full duplex communications. By performing sidelink communications using the full duplex mode, the UE may improve reliability, coverage, and capacity performance. The UE may initiate sidelink full duplex communications based on a self-interference measurement by the UE, which may provide for reduced interference while operating in the full duplex mode. In some examples, a base station may determine available and interference-free resources or resources with reduced interference to schedule for the self-interference measurement by the UE, which may allow for the UE to perform an accurate self-interference measurement to trigger full duplex communications with reduced interference.

Aspects of the disclosure are initially described in the context of wireless communications systems. Additional aspects are described with reference to process flows. Aspects of the disclosure are further illustrated by and described with reference to apparatus diagrams, system diagrams, and flowcharts that relate to resource allocation for sidelink full duplex communications.

FIG. 1 illustrates an example of a wireless communications system 100 that supports resource allocation for sidelink full duplex communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of T, $=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or code-book-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent trans-mission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to differ-ent receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configu-ration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communi-cate over logical channels. A Medium Access Control (MAC) layer may perform priority handling and multiplex-ing of logical channels into transport channels. The MAC layer may also use error detection techniques, error correc-tion techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the like-lihood that data is received correctly over a communication link 125. HARQ may include a combination of error detec-tion (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may sup-port same-slot HARQ feedback, where the device may provide HARQ feedback in a specific slot for data received in a previous symbol in the slot. In other cases, the device may provide HARQ feedback in a subsequent slot, or according to some other time interval.

Figure 2:
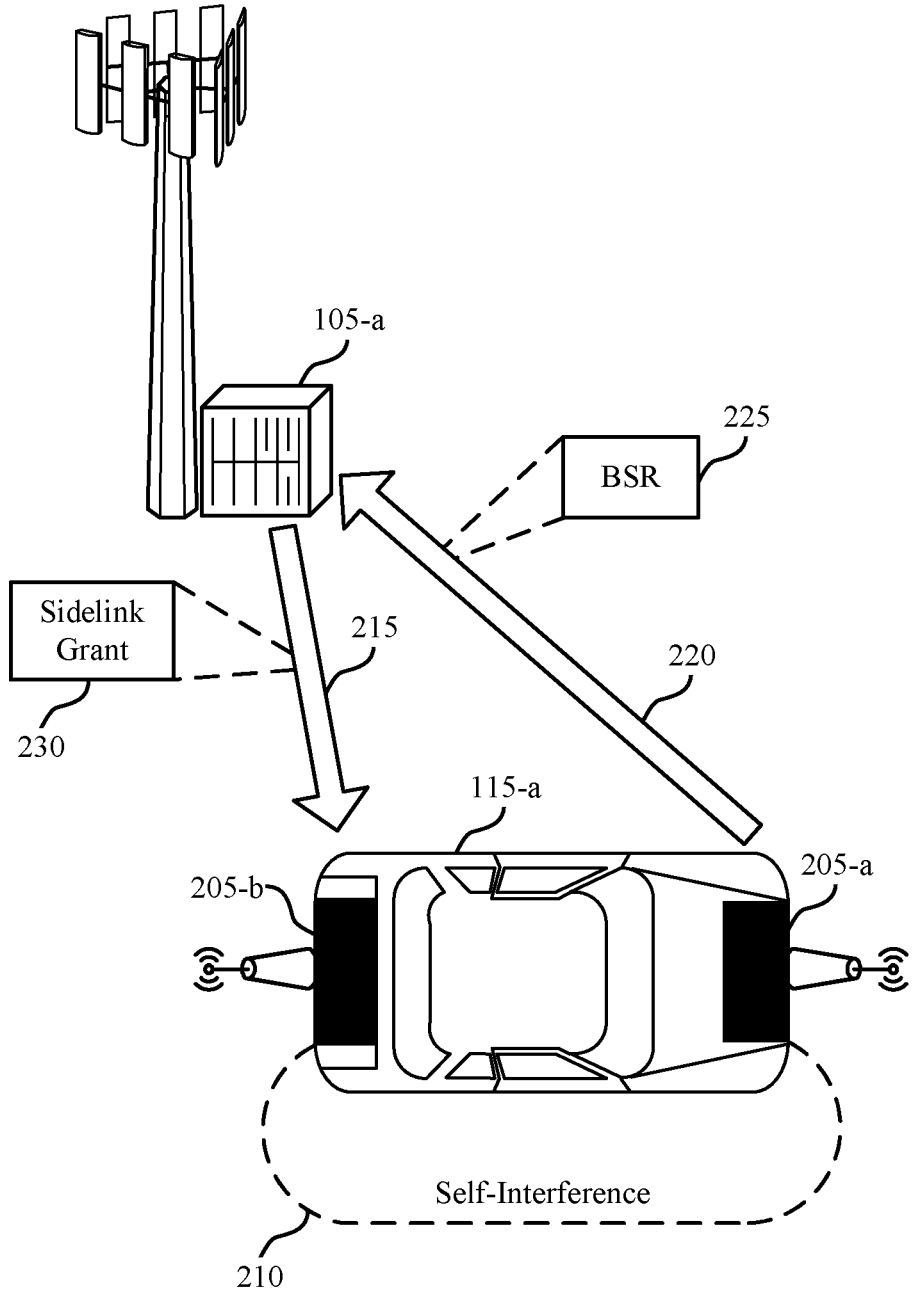
FIG. 2 illustrates an example of a wireless communications system that supports resource allocation for sidelink full duplex communications in accordance with aspects of the present disclosure.

In some examples, a UE 115 may include one or more TRPs that may each include multiple antenna components. In some examples, the UE 115 may operate in a sidelink resource allocation mode (e.g., Mode 1) in which a base station 105 schedules resources for sidelink communications between the UE 115 and one or more other sidelink UEs 115. The UE 115 may transmit a message (e.g., a BSR) to the base station 105 to request resources for sidelink commu-nications by the UE 115. The message may include an indication of a self-interference measurement by the UE 115 using the requested resources. The base station 105 may transmit a grant scheduling resources for the self-interfer-ence measurement by the UE 115. The UE 115 may measure interference between a first set of antenna components of a first TRP of the UE 115 that is configured for transmission and a second set of antenna components of a second TRP of the UE 115 that is configured for reception using the scheduled resources. The UE 115 may determine resources that are available for sidelink full duplex communications (e.g., with relatively low self-interference) by the UE 115 based on the measured self-interference. The UE 115 may transmit a sidelink feedback message indicating the resources that are available for sidelink full duplex commu-nications by the UE 115 to the base station 105. The base station 105 may transmit a sidelink grant that schedules sidelink resources for full duplex communications by the UE 115 based on the sidelink feedback message. Accordingly, the base station 105 may schedule full duplex communica-tions by the UE 115 in time-frequency resources in which the UE 115 is capable of performing sidelink full duplex communications with reduced self-interference FIG. 2 illustrates an example of a wireless communica-tions system 200 that supports resource allocation for side-link full duplex communications in accordance with aspects of the present disclosure. In some examples, the wireless communications system 200 may implement aspects of the wireless communications system 100. The wireless commu-nications system may include a base station 105-*a* and a UE 115-*a*, which may be examples of a base station 105 and a UE 115 as described with reference to FIG. 1. In some examples, UE 115-*a* may be a vehicle (e.g., a vehicle UE (VUE)). UE 115-*a* may communicate with base station 105-*a* via a downlink communication link 215 and an uplink communication link 220. In some examples, base station 105-*a* may schedule sidelink resources for self-interference measurement, sidelink full duplex communications, or both, by UE 115-*a*.

UE 115-*a* may include multiple TRPs 205 (e.g., TRPs 205-*a* and 205-*b*), and may be referred to as mTRP UE 115-*a*. TRPs 205-*a* and 205-*b* may be configured to transmit signals in conjunction with one another, individually (e.g., separately from one another), or both. In this regard, the TRPs 205 may include, but are not limited to, antennas, antenna panels, and the like. The base band processing for a mTRP UE 115, such as UE 115-*a*, may be performed in a centralized unit of the UE 115, and the radio frequency (RF) processing may be performed near to respective TRPs 205.

A mTRP system (e.g., a mTRP UE 115, base station, network node, or some other device) may include TRPs 205, the number and configuration of which may be based on network design, implementation, or features, or device capabilities. For example, the TRPs 205 may be installed to provide radio coverage or adapt existing radio coverage for the system or device. By including multiple TRPs 205, a UE 115 may support improved reliability, coverage, and capacity performance within the wireless communications system 200 (e.g., through flexible deployment scenarios). In some examples, each TRP 205 may be associated with a set of frequency resources (e.g., antenna resources, a subset of receive beams, a subset of transmit beams, or a combination thereof).

In some examples (e.g., V2X communications), a device supporting sidelink communications (e.g., a car, such as VUE 115-*a*) may include a front antenna panel and a rear antenna panel (e.g., TRP 205-*a* and TRP 205-*b*). Subsequently, larger vehicles (such as trucks and trailers) may include two or more TRPs 205. Some UEs 115 may include a single TRP 205. In some examples, the TRPs 205 of UE 115-*a* may be positioned proximate (e.g., close) to one another. In other examples, the TRPs 205 of UE 115-*a* may be physically separated from each other by some distance. In the example of the wireless communications system 200, TRP 205-*a* may be positioned near the front of the vehicle, and TRP 205-*b* may be positioned near the rear of the vehicle. In this example, TRP 205-*a* (e.g., a first antenna panel) and TRP 205-*b* (e.g., a second antenna panel) may be separated from one another by several meters (e.g., the length of the vehicle). This physical separation may be even larger, for example in the case of larger UEs 115, such as semi-trucks, where multiple TRPs 205 may be physically separated from one another by twenty meters or more.

The location of the TRPs 205 on different parts of a device may improve reliability in safety and other applications (e.g., applications in which high robustness may be desired, such as collision detection and avoidance applications). For example, because UE 115-*a* is equipped with TRP 205-*a* near the front of UE 115-*a* and TRP 205-*b* near the rear of UE 115-*a*, UE 115-*a* may support more coverage than if UE 115-*a* is equipped with a single TRP 205. Data coverage for a mTRP UE 115 (e.g., for transmissions by the UE 115) may be biased toward other devices located in the direction of the TRPs 205 of the UE 115. In some examples, coverage from one part of a device may be more important than coverage from other parts of the device. For example, during V2X communications, a VUE 115 may prioritize front and back coverage or 360-degree coverage (e.g., which may be dependent on packet content, a type of packet received at the device, or the like) over side coverage. Some mTRP devices, such as UE 115-*a*, may desire full coverage for reception of messages (e.g., 360-degree coverage). As such, UE 115-*a* may use two or more TRPs 205 (e.g., positioned on the front, rear, left side, right side, or some other location on UE 115-*a*) to receive data packets from other UEs 115, and UE 115-*a* may use a single TRP 205-*a* to transmit packets to other devices (e.g., to reduce bias).

UE 115-*a* may support half-duplex communications, subband full duplex communications, single frequency full duplex (SFFD) communications, or a combination thereof, using TRPs 205-*a* and 205-*b*. UE 115-*a* may determine which communication mode to operate in for respective communications (e.g., sidelink communications) based on one or more parameters associated with the communications. During a half-duplex mode, UE 115-*a* may transmit messages within a first set of resources and may receive signaling within a second set of resources that is non-overlapping with the first set (e.g., in the temporal domain). UE 115-*a* may perform half-duplex communications using TRP 205-*a*, TRP 205-*b*, or both.

During a subband full duplex mode, UE 115-*a* may perform simultaneous transmission and reception via a portion of frequency or antenna resources associated with a TRP 205 (e.g., TRP 205-*a*, TRP 205-*b*, or both). For example, a portion of antenna components of the TRP 205 may transmit signaling via a first subband (e.g., a first set of frequency resources) and a remaining subset of antenna components of the TRP 205 may concurrently receive signaling via a second subband (e.g., a second set of frequency resources).

As described herein, UE 115-*a* may additionally or alternatively support simultaneous transmission and reception via the same time and frequency resource (e.g., a slot) using multiple TRPs 205 during a SFFD mode. During the SFFD mode, TRP 205-*a* of UE 115-*a* may be configured for transmission of data and TRP 205-*b* may be configured for reception of data using the same time and frequency resource. As such, UE 115-*a* may perform full duplex communications (e.g., SFFD communications) using two or more half-duplex TRPs (e.g., a transmit panel and a receive panel).

UE 115-*a* may operate in SFFD mode, subband full duplex mode, or half-duplex mode, or transition between a combination thereof, for performing sidelink communications. Full duplex operations (e.g., subband full duplex or SFFD) may allow for UE 115-*a* to increase (e.g., double) a link capacity, break half-duplex operation constraints (e.g., transmission and reception differ in time and frequency), and reduce latency associated with communications. SFFD operations may provide for more efficient resource allocation during communications by UE 115-*a*. In some examples, a device (e.g., a VUE), such as UE 115-*a*, that is equipped with multiple TRPs 205 and is capable of simultaneous transmission and reception using a same time and frequency resource may be referred to as a full duplex capable device. A full duplex capable device may operate in full duplex mode, back-off half-duplex mode, or both.

In some examples, full duplex communications (e.g., SFFD communications) by a full duplex capable UE 115 may be associated with increased interference. For example, UE 115-*a* may experience self-interference 210 (e.g., a reduced signal to interference plus noise ratio (SINR)) between TRP 205-*a* (e.g., a transmit panel) and TRP 205-*b* (e.g., a receive panel) during full duplex communications. The self-interference 210 may occur if a signal transmitted via TRP 205-*a* is received at TRP 205-*b* (e.g., which may interfere with other signaling to be received at TRP 205-*b*). The self-interference 210 may decrease as a distance between TRPs 205-*a* and 205-*b* increases. For example, TRPs 205-*a* and 205-*b* may be installed on different parts of UE 115-*a* (e.g., a car) to reduce self-interference. UE 115-*a* may additionally or alternatively experience cluster interference from surrounding objects during full duplex communications. If UE 115-*a* experiences relatively high interference, UE 115-*a* may switch from the full duplex mode to a half-duplex mode (e.g., or a subband full duplex mode) to reduce the interference.

UE 115-*a* may be an example of a sidelink UE 115-*a* (e.g., a VUE 115-*a* that supports V2X communications). In some cases, a sidelink UE 115 may operate according to a sidelink resource allocation Mode 2, in which the sidelink UE 115 may autonomously select sidelink time and frequency resources for performing sidelink communications. In the example of the wireless communications system 200, UE 115-*a* may operate according to a sidelink resource allocation Mode 1, in which base station 105-*a* may allocate resources for sidelink communications between UE 115-*a* and one or more other sidelink UEs 115.

During sidelink resource allocation Mode 1, UE 115-*a* may transmit a message, such as a BSR 225 (e.g., an SR message) to base station 105-*a* via the uplink communication link 220 (e.g., a Uu link) to request sidelink resources for transmission of sidelink data. Base station 105-*a* may transmit a sidelink grant 230 (e.g., downlink control information (DCI) that includes the sidelink grant 230) to UE 115-*a* via the downlink communication link 215 (e.g., a Uu link) based on receiving the BSR 225. The sidelink grant 230 may schedule one or more available sidelink resources for the requested sidelink transmission by UE 115-*a*. UE 115-*a* may transmit the sidelink data to a second UE 115 using the allocated resources.

In some cases, base station 105-*a* may not know what communication mode (e.g., half-duplex, SFFD, or subband full duplex) UE 115-*a* may operate in during the requested sidelink transmission. Additionally or alternatively, base station 105-*a* may not know the intended destination (e.g., information for a receiver UE 115) of the requested sidelink transmission by UE 115-*a*. For example, base station 105-*a* may not know a receiver ID of the second UE 115. If base station 105-*a* is unaware of the intended communication mode or the destination ID of a requested sidelink transmission, base station 105-*a* may schedule resources for full duplex communications by UE 115-*a* at a time when UE 115-*a* (e.g., or the second UE 115) may not operate in a full duplex mode, or when full duplex communications by UE 115-*a* may result in significant interference.

For example, base station 105-*a* may schedule transmission of a first sidelink message by UE 115-*a* in a first time and frequency resource and transmission of a second sidelink message from a second UE 115 to UE 115-*a* in the first time and frequency resource. UE 115-*a* may operate in full duplex mode to transmit and receive the first and second sidelink messages within the first time and frequency resource, which may result in relatively high self-interference 210 between TRP 205-*a* and TRP 205-*b* of UE 115-*a*. Accordingly, it may be desirable for a full duplex capable UE 115, such as UE 115-*a*, to identify resources on which the UE 115 is capable of performing sidelink communications (e.g., without experiencing significant self-interference between TRPs 205 of the UE 115), and transmit an indication of the resources, the intended communication mode of the UE 115, or both, to base station 105-*a*.

As described herein, a full duplex capable UE 115 may request resources for performing a self-interference measurement and initiate sidelink full duplex communications based on the measurements. For example, UE 115-*a* may transmit a request for resources for a sidelink transmission by UE 115-*a* via a BSR 225, and UE 115-*a* may indicate an intended self-interference measurement for the requested resources via the BSR 225. Base station 105-*a* may schedule resources (e.g., interference-free resources) for UE 115-*a* to use for performing the self-interference measurement based on receiving the BSR 225. UE 115-*a* may perform the self-interference measurement using the scheduled resources to identify available receive beams, time resources, frequency resources, or a combination thereof (e.g., a receiver configuration), on which the UE 115 is capable of performing full duplex communications without incurring significant self-interference. UE 115-*a* may initiate sidelink full duplex communications based on the measured self-interference by transmitting an indication of the measured self-interference and the identified resources for full duplex communications to base station 105-*a* via a sidelink feedback message. Accordingly, full duplex capable UE 115-*a* may obtain accurate self-interference measurements to determine whether to initiate sidelink full duplex communications, which may reduce interference and latency associated with sidelink communications by UE 115-*a*.

Figure 3:
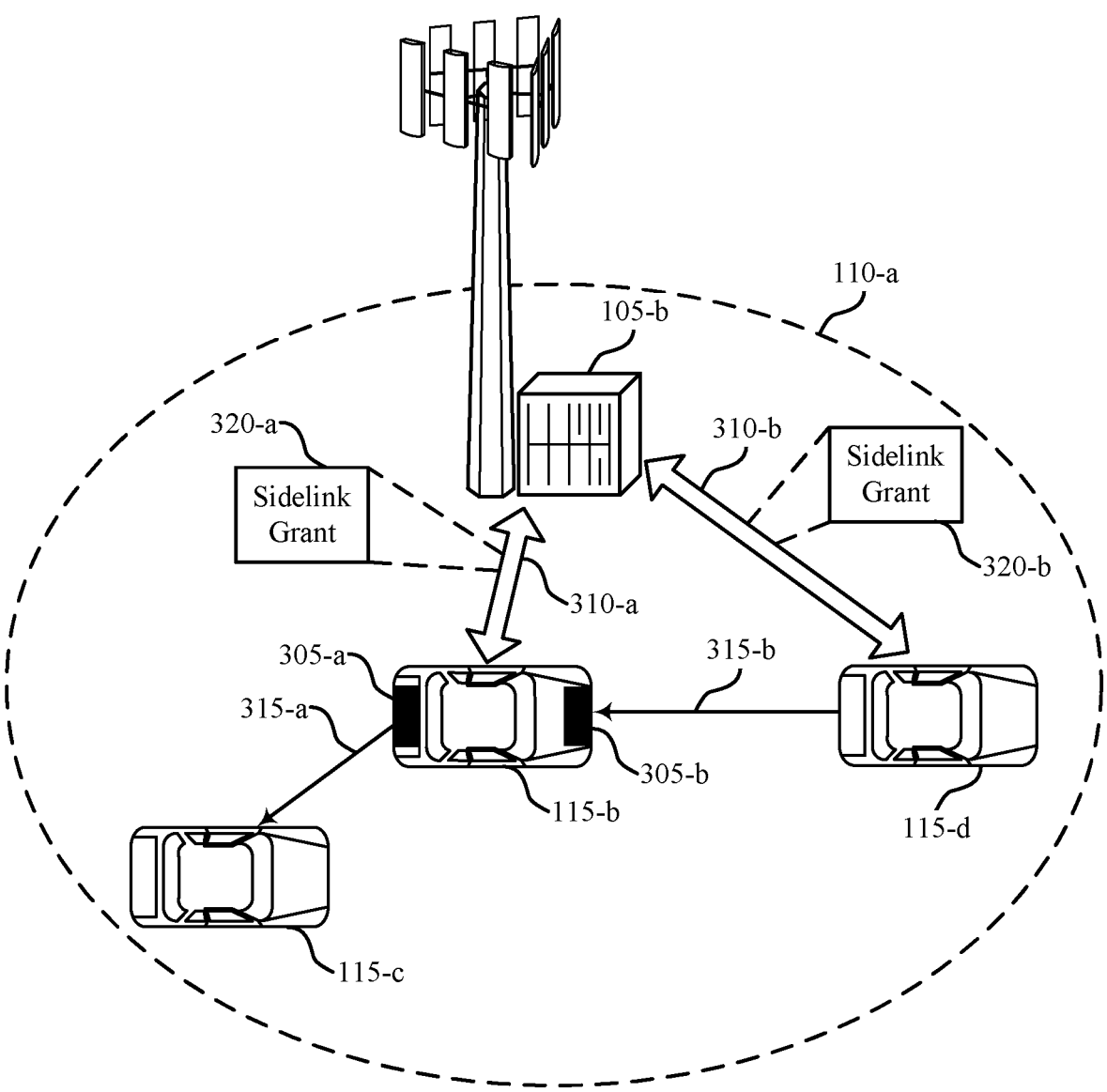
FIG. 3 illustrates an example of a wireless communications system that supports resource allocation for sidelink full duplex communications in accordance with aspects of the present disclosure.

FIG. 3 illustrates an example of a wireless communications system 300 that supports resource allocation for sidelink full duplex communications in accordance with aspects of the present disclosure. In some examples, the wireless communications system 300 may implement aspects of the wireless communications systems 100 and 200. The wireless communications system 300 may include a base station 105-*b* and UEs 115-*b*, 115-*c*, and 115-*d*, which may be examples of a base station 105 and a UE 115 as described with reference to FIGS. 1 and 2. In some examples, UEs 115-*b*, 115-*c*, and 115-*d* (e.g., VUEs 115) may communicate with each other via sidelink communication links 315 (e.g., PC5 links). Base station 105-*b* may communicate with UEs 115-*b* and 115-*d* within geographic coverage area 110-*a* via communication links 310 (e.g., Uu links). In some examples, UE 115-*b* may perform a self-interference measurement to identify resources on which UE 115-*b* may operate in a full duplex mode, and base station 105-*b* may schedule resources for sidelink communications by UE 115-*b* based on the self-interference measurement, as described with reference to FIG. 2.

UE 115-*b* may include multiple TRPs 305 (e.g., TRPs 305-*a* and 305-*b*), which may be examples of the TRPs 205 of UE 115-*a*, as described with reference to FIG. 2. For example, TRPs 305-*a* and 305-*b* may be located on front and rear portions (e.g., or one or more other locations) of UE 115-*b*, may include one or more antenna components, and may be configured for transmission or reception during full duplex communications (e.g., SFFD communications) by UE 115-*b*. In the example of the wireless communications system 300, TRP 305-*a* of UE 115-*b* may be configured for transmission and TRP 305-*b* of UE 115-*b* may be configured for reception during full duplex communications.

UE 115-*b* may communicate with UEs 115-*c* and 115-*d* via sidelink communication links 315-*a* and 315-*b*, respectively. UE 115-*b* may support simultaneous transmission of a first sidelink message and reception of a second sidelink message using the same time and frequency resource (e.g., slot). For example, UE 115-*b* may transmit the first sidelink message to UE 115-*c* using TRP 305-*a* (e.g., a panel configured for transmission), and UE 115-*b* may receive the second sidelink message from UE 115-*d* using TRP 305-*b* (e.g., a panel configured for reception). As such, UE 115-*b* may be referred to as a full duplex capable UE 115, as described with reference to FIG. 2. UE 115-*b* may support half-duplex communications, SFFD communications, subband full duplex communications, or a combination thereof. In some examples, UE 115-*b* may determine which communication mode to use for future sidelink communications based on a sidelink grant 320 (e.g., a resource scheduled for each packet received or transmitted by UE 115-*b*), a self-interference measurement, an RSRP measurement from each TRP 305, or a combination thereof.

In the example of the wireless communications system 300, UEs 115-*b*, 115-*c*, and 115-*d* may operate according to sidelink resource allocation Mode 1. As such, if UE 115-*b* has a sidelink data packet to transmit (e.g., to UE 115-*c*), UE 115-*b* will transmit a first BSR to base station 105-*b* via communication link 310-*a* to request resources for the sidelink communications by UE 115-*b*. If UE 115-*d* has a sidelink data packet to transmit (e.g., to UE 115-*b*), UE 115-*d* will transmit a second BSR to base station 105-*b* via communication link 310-*b* to request scheduling of resources for transmission of the sidelink data packet. Base station 105-*b* may schedule resources for the respective transmissions by UEs 115-*b* and 115-*d* based on the BSRs.

Base station 105-*b* may transmit sidelink grants 320-*a* and 320-*b* to UEs 115-*b* and 115-*d*, respectively, to schedule the resources for the requested transmissions. UE 115-*b* may detect a resource grant and reservation for sidelink communications at UE 115-*b* via both DCI and sidelink control information (SCI). For example, UE 115-*b* may receive sidelink grant 320-*a* via DCI, which may indicate a resource reservation for a sidelink transmission by UE 115-*b*, and UE 115-*b* may receive SCI from UE 115-*d*, which may indicate a resource reservation for the respective sidelink transmission by UE 115-*d* to UE 115-*b* (e.g., based on a sidelink grant 320-*b* received at UE 115-*d*). UE 115-*b* may similarly transmit SCI to UE 115-*c* to indicate a resource reservation for a scheduled transmission from UE 115-*b* to UE 115-*c*.

In some cases, the first and second BSRs may not include a destination ID for UEs 115-*c* and 115-*b*, respectively (e.g., the UEs 115 that are intended for reception of the requested transmission). Additionally or alternatively, the first and second BSRs may not indicate a transmission mode in which the respective UEs 115-*b* and 115-*d* (e.g., the UEs 115 that are transmitting on the requested resources) will operate during the requested transmissions. Base station 105-*b* may thereby schedule full duplex communications by UE 115-*b* during a time period in which UE 115-*b* may not support full duplex communications.

In one example, sidelink grant 320-*a* may schedule a first time and frequency resource for transmission of the first sidelink message by UE 115-*b*, and sidelink grant 320-*b* may schedule the first time and frequency resource for transmission of the second sidelink message by UE 115-*d*. If UE 115-*d* intends to transmit the second sidelink message to UE 115-*b*, UE 115-*b* will operate in a full duplex mode to transmit the first sidelink message to UE 115-*c* using TRP 305-*a* and receive the second sidelink message from UE 115-*d* using TRP 305-*b* within the same time and frequency resource, which may result in self-interference at UE 115-*b* (e.g., between TRP 305-*a* and TRP 305-*b*). Accordingly, it may be desirable for full duplex capable UE 115-*b* to determine a receiver configuration (e.g., a receive beam, time resources, frequency resources, or a combination thereof) on which UE 115-*b* is capable of performing full duplex communications (e.g., SFFD communications) without incurring significant interference, and initiate sidelink full duplex communications based on the receiver configuration.

As described herein, UE 115-*b* may request resources for performing a self-interference measurement and initiate sidelink full duplex communications based on the measurement. For example, UE 115-*b* may transmit a BSR to base station 105-*b* to request resources for sidelink transmission by UE 115-*b*, and the BSR (e.g., one or more fields or bits in the BSR) may include an indication that the UE 115 intends to perform self-interference measurement for the requested transmission. The one or more fields in the BSR may be configured to include the self-interference measurement indication and request. Base station 105-*b* may receive the BSR and schedule resources (e.g., interference-free resources) for the self-interference measurement by UE 115-*b*.

In some examples, the BSR may include a TCI state that UE 115-*b* intends to use for the transmission requested via the BSR (e.g., transmit beam(s) for future sidelink transmission), a receiver configuration indicator (RCI) state that UE 115-*b* intends to use for self-interference measurement and potential data reception (e.g., reception of future sidelink messages by UE 115-*b*), or both. The RCI state may indicate a spatial configuration (e.g., a receive beam) associated with TRP 205-*b* (e.g., a receiver panel) of UE 115-*b*. Additionally or alternatively, the BSR may include an indication of a time occasion (e.g., a time period, a resource, or the like) at which UE 115-*b* intends to perform the self-interference measurement. One or more fields in the BSR may be configured (e.g., or re-configured) for conveying the self-interference measurement request, additional self-interference measurement information, or both.

After receiving the self-interference measurement request via a BSR, base station 105-*b* may grant sidelink resources, CSI-RS resources, or both to UE 115-*b* for performing the self-interference measurement via a sidelink grant 320-*a*. In one example, base station 105-*b* may grant sidelink resources (e.g., sidelink normal resources, such as PSSCH or PSCCH resources). Base station 105-*b* may schedule available (e.g., interference-free or reduced interference) sidelink resources such that UE 115-*b* may perform an accurate self-interference measurement using the scheduled resources. UE 115-*b* may perform the self-interference measurement by transmitting signaling using TRP 205-*a* within the scheduled sidelink resources and measuring a received signal metric level (e.g., a reference signal receive power (RSRP) level) at TRP 205-*b*. For example, UE 115-*b* may compare a first RSRP associated with a signal transmitted via TRP 205-*a* with a second RSRP associated with a signal received at TRP 205-*b* to determine if interference between the TRPs 205 occurs. If base station 105-*b* schedules accurate and interference-free sidelink resources, any signal metric level that may be measured at TRP 205-*b* will be associated with the transmission by TRP 205-*a* (e.g., there may not be interference from other devices or signals in the scheduled resources). As such, the measured signal metric level may represent the self-interference at UE 115-*b*.

Base station 105-*b* may identify each sidelink resource and determine whether self-interference measurement by UE 115-*b* is feasible in the sidelink resource, if the self-interference measurement by UE 115-*b* will be accurate if done in the sidelink resource, or both, based on scheduling information for the respective sidelink resource. For example, base station 105-*b* may determine whether a sidelink grant 320 (e.g., a sidelink grant 320 issued by base station 105-*b* or one or more neighboring base stations 105) reserves the sidelink resource for transmission by another UE 115 (e.g., if the resource is ensured by a base station 105), whether the sidelink resource is scheduled for a retransmission (e.g., reuse of the resource), or both. If the BSR transmitted by UE 115-*b* indicates a time occasion at which UE 115-*b* intends to perform the self-interference measurement, base station 105-*b* will evaluate which time and frequency resources around the indicated time occasion may be interference-free by identifying one or more sidelink grants 320 (e.g., overlapping grants) that base station 105-*b* would have given in the cell (e.g., geographic coverage area 110-*a*) for the indicated time occasion.

In some examples, base station 105-*b* may transmit an indication of the feasibility, an accuracy level associated with the resources, or both, to UE 115-*b* via the sidelink grant 320-*a*. For example, base station 105-*b* may indicate whether the scheduled sidelink resources for self-interference measurement by UE 115-*b* are not accurate (e.g., reserved, associated with significant interference, or both), accurate for a partial set of frequencies (e.g., a set of subchannel indices may be reused by another UE 115 and remaining frequencies may be available), or accurate for each frequency (e.g., available and interference-free for an entire set of frequencies) in a slot. In some examples, UE 115-*b* may determine whether to perform the self-interference measurement using the scheduled sidelink resources based on the feasibility and accuracy indications.

Additionally or alternatively, base station 105-*b* may grant CSI-RS resources (e.g., system wide resources that may be scheduled for beam discovery, beam refinement, self-interference measurements, or a combination thereof) to UE 115-*b* for performing the self-interference measurement. In some examples (e.g., for FR2), the CSI-RS resources may be used for beam management (e.g., beam discovery, beam refinement, or the like). Additionally or alternatively, the CSI-RS resources (e.g., the same set of CSI-RS resources) may be used for self-interference measurement for full duplex determination by a sidelink UE 115.

The CSI-RS resources may be associated with a set of sequences, and one or more sequences of the set of sequences for the CSI-RS resources may be configured for self-interference measurement. For example, a first subset of the sequences for the CSI-RS resources may be allocated for beam management procedures (e.g., beam discovery, beam refinement, or the like), and a second subset of the sequences for the CSI-RS resources may be reserved for self-interference measurement by a full duplex capable UE 115. If base station 105-*b* schedules CSI-RS resources for the self-interference measurement, UE 115-*b* determines whether the scheduled CSI-RS resources are for self-interference measurement or for another application (e.g., beam management procedures) based on a sequence of the CSI-RS resources. If UE 115-*b* discovers a sequence that is configured for self-interference measurement, UE 115-*b* may determine that the sequence of resources is for self-interferences measurements rather than beam management. The sequences that are reserved for self-interference measurement may be indicated to UE 115-*b* via signaling, or may be configured (e.g., pre-configured) at UE 115-*b*.

UE 115-*b* may perform the self-interference measurement by transmitting signaling via the CSI-RS resources using TRP 205-*a*. UE 115-*b* may measure a signal metric level (e.g., a RSRP level) at TRP 205-*b* (e.g., a receive panel of UE 115-*b*) to determine an amount of self-interference at UE 115-*b*. In one example, one or more receiving UEs 115 (e.g., such as UE 115-*c*) may be unaware of the self-interference measurement by UE 115-*b* using the CSI-RS resources. The receiving UEs 115 may ignore the CSI-RS transmissions from UE 115-*b* (e.g., the self-interference measurement may be performed autonomously by UE 115-*b*).

Additionally or alternatively, UE 115-*b* may perform self-interference measurement and beam management procedures using the scheduled CSI-RS resources. For example, UE 115-*b* may inform receiving UE 115-*c* (e.g., or one or more other receiving UEs 115) of the sequence of CSI-RS resources and transmission beams (e.g., transmission quasi-co-location (QCL) assumptions) that UE 115-*b* intends to sweep (e.g., for null forming) and to use for self-interference measurement (e.g., via a self-interference measurement configuration). The self-interference measurement configuration may configure receiving UE 115-*c* with the CSI-RS resources that UE 115-*b* intends to use for self-interference measurement and may indicate a set of TCI states for communications between UE 115-*b* and receiving UE 115-*c*. UE 115-*b* may transmit signaling via the indicated resources and beams (e.g., using the set of TCI states), and UE 115-*c* may measure a signal metric level (e.g., RSRP level) associated with each receive beam. UE 115-*c* may transmit a report to UE 115-*b* indicating the measured RSRP levels for each beam (e.g., which may indicate different null locations or changes to a main beam used for communications between UE 115-*b* and UE 115-*c*). In some examples, the main beam used for communications between UE 115-*b* and UE 115-*c* may not change significantly. UE 115-*b* may indicate a QCL relationship with one or more TCI states used for the current link with UE 115-*c*, such that UE 115-*c* may measure RSRP associated with the receive beam that corresponds to the indicated TCI state (e.g., transmission beam). UE 115-*b* may update one or more TCI states for communications with UE 115-*c* based on the report indicating the RSRP levels from UE 115-*c*. Additionally or alternatively, UE 115-*b* may measure self-interference between TRP 205-*a* and TRP 205-*b* based on transmission of the signaling via the CSI-RS resources.

Accordingly, UE 115-*b* may perform the self-interference measurement for the requested transmission using sidelink resources, CSI-RS resources, or both. UE 115-*b* may determine whether to operate in a SFFD mode, a subband full duplex mode, or a half-duplex mode for performing the sidelink transmission, resources in which to operate in the determined communication mode, or both, based on the measured self-interference. In some examples, UE 115-*b* may operate in a full duplex mode unless UE 115-*b* determines that the measured self-interference will be above a configured self-interference threshold for sidelink full duplex communications in a set of sidelink resources. If the measured self-interference is relatively high (e.g., above the self-interference threshold), UE 115-*b* may determine to communicate in a half-duplex mode or a subband full duplex mode for communications within the set of sidelink resources to reduce the interference. If the measured self-interference is relatively low (e.g., below the self-interference threshold), UE 115-*b* may determine to communicate in a SFFD mode for communications within the set of resources.

UE 115-*b* may transmit sidelink feedback and assistance information (e.g., via a sidelink feedback message) to base station 105-*b* to initiate, inhibit, or delay full duplex communications based on the measured self-interference. The sidelink feedback message may indicate the intended communication mode of UE 115-*b*, a spatial configuration (e.g., a receive beam) on which UE 115-*b* is capable of receiving signaling according to the intended communication mode, one or more time and frequency resources on which UE 115-*b* is capable of performing communications using the intended communication mode, or a combination thereof. In some examples, UE 115-*b* may transmit an indication of an ID of UE 115-*b* via the sidelink feedback message. The ID of UE 115-*b* may correspond to a destination ID of a packet intended for reception by UE 115-*b* (e.g., in case of a re-configuration of a sidelink grant 320, such as sidelink grant 320-*b*). UE 115-*b* may indicate the corresponding information via the sidelink feedback message for each resource that is scheduled (e.g., granted and reserved) by base station 105-*b*.

Base station 105-*b* may receive the sidelink feedback message and schedule resources for sidelink communications by UE 115-*b* accordingly. Base station 105-*b* may evaluate whether UE 115-*b* is available to receive sidelink messages on the resources (e.g., slots) indicated in the sidelink feedback message. Base station 105-*b* may determine available resources (e.g., SFFD resources, subband full duplex resources, half-duplex resources, or a combination thereof) and transmit beams (e.g., a receiver spatial configuration) based on the sidelink feedback message. In some examples, base station 105-*b* may schedule a same time and frequency resource for transmission of a first sidelink message by UE 115-*b* and transmission of a second sidelink message to UE 115-*b* if the sidelink feedback message indicates that UE 115-*b* supports full duplex communications during the time and frequency resource. In some examples, base station 105-*b* may schedule different time and frequency resources for a transmission by UE 115-*b* than for a transmission to UE 115-*b* based on the sidelink feedback message indicating that UE 115-*b* may not operate in a full duplex mode during the scheduled transmissions.

In one example, base station 105-*b* may re-configure sidelink grant 320-*b* for UE 115-*c* based on the sidelink feedback message received from UE 115-*b*. Base station 105-*b* may determine that the BSR from UE 115-*c* requested resources for transmission of a sidelink message to UE 115-*b* (e.g., base station 105-*b* may determine that the destination ID of the sidelink message is the same as the ID of UE 115-*b* indicated via the sidelink feedback message). If the sidelink feedback message indicates that UE 115-*b* will not operate in full duplex mode during the time and frequency resource that was previously scheduled for the transmission by UE 115-*b* and the transmission by UE 115-*c* to UE 115-*b*, base station 105-*b* may re-configure sidelink grant 320-*b* to schedule a different time and frequency resource for the transmission by UE 115-*c* to UE 115-*b*, which may reduce interference at UE 115-*b*.

Accordingly, a sidelink full duplex capable UE 115 may request resources for a self-interference measurement and determine whether and when to operate in a full duplex mode for sidelink communications based on the self-interference measurement, which may improve a reliability and quality of communications by the UE 115.

Figure 4:
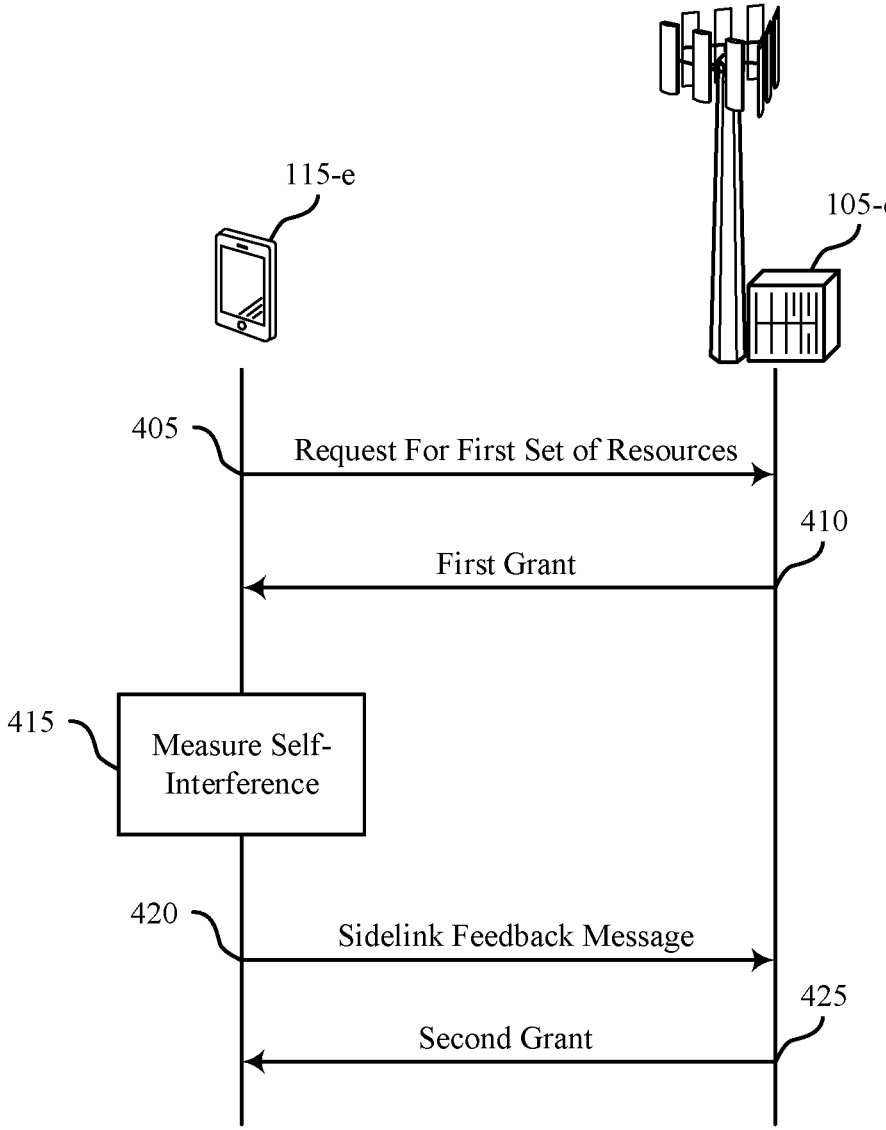
FIG. 4 illustrates an example of a process flow that supports resource allocation for sidelink full duplex communications in accordance with aspects of the present disclosure.

FIG. 4 illustrates an example of a process flow 400 that supports resource allocation for sidelink full duplex communications in accordance with aspects of the present disclosure. The process flow 400 may implement various aspects of the present disclosure described with reference to FIGS. 1-3. The process flow 400 may include UE 115-*e*, and base station 105-*c*, which may be examples of a UE 115 and a base station 105 as described with reference to FIGS. 1-3. In some examples, UE 115-*e* may be a VUE, or some other device. UE 115-*e* may be configured to request resources for a self-interference measurement and initiate sidelink full duplex communications based on the measurement.

It is understood that the devices and nodes described by the process flow 400 may communicate with or be coupled with other devices or nodes that are not illustrated. For instance, UE 115-*e* and base station 105-*c* may communicate with one or more other UEs 115, base stations 105, or other devices. Alternative examples of the following may be implemented, where some steps are performed in a different order than described or are not performed at all. In some cases, a step may include additional features not mentioned below, or further steps may be added.

At 405, UE 115-*e* may transmit a message to base station 105-*c* that includes a request for a first set of resources for sidelink communications by UE 115-*e* and an indication of a self-interference measurement by UE 115-*e* using the first set of resources. In some examples, the message may be a BSR, as described with reference to FIGS. 2 and 3. One or more fields in the BSR may be configured to include the indication of the self-interference measurement, other self-interference measurement information, or both.

At 410, base station 105-*c* may transmit a first grant to UE 115-*e*. The first grant may schedule the first set of resources for UE 115-*e* based on the message. In some examples, the first set of resources may be sidelink resources (e.g., resources allocated for a PSSCH or PSCCH). Additionally or alternatively, the first set of resources may be CSI-RS resources (e.g., system wide resources allocated for beam discovery, beam refinement, self-interference measurement, or a combination thereof).

At 415, UE 115-*e* may measure self-interference in the first set of resources. UE 115-*e* may measure the self-interference between a first set of antenna components of a first TRP of UE 115-*e* and a second set of antenna components of a second TRP of UE 115-*e*. The first TRP may be configured for transmission and the second TRP may be configured for reception. In some examples, UE 115-*e* may transmit signaling via the first set of resources using the first TRP, and UE 115-*e* may measure the self-interference based on a detected signal metric level received at the second TRP.

At 420, UE 115-*e* may transmit a sidelink feedback message to base station 105-*c*. The sidelink feedback message may include an indication of a second set of sidelink resources that are available for sidelink full duplex communications by UE 115-*e* based on the measured self-interference. In some examples, UE 115-*e* may transmit an indication of an ID of UE 115-*e* to base station 105-*c* via the sidelink feedback message. The ID of UE 115-*e* may correspond to a destination ID of a packet intended for reception by UE 115-*e*.

At 425, base station 105-*c* may transmit a second grant to UE 115-*e*. The second grant may schedule a third set of sidelink resources for the sidelink full duplex communications by UE 115-*e* based on the sidelink feedback message. The third set of resources may at least partially overlap with the second set of sidelink resources. For example, base station 105-*c* may determine available resources of the second set of resources to schedule for the sidelink full duplex communications.

Figure 5:
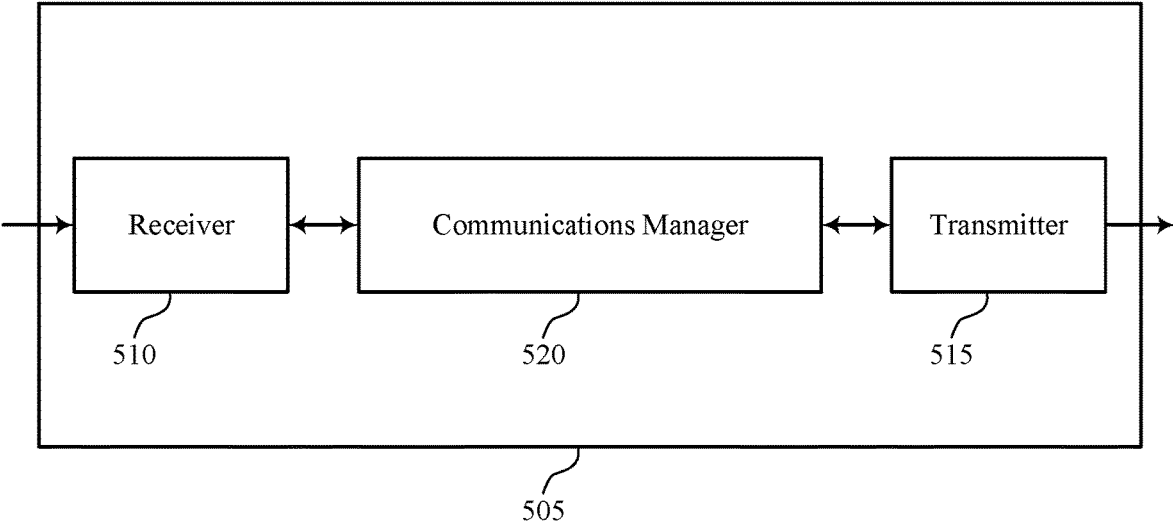
FIGS. 5 and 6 show block diagrams of devices that support resource allocation for sidelink full duplex communications in accordance with aspects of the present disclosure.

FIG. 5 shows a block diagram 500 of a device 505 that supports resource allocation for sidelink full duplex communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to resource allocation for sidelink full duplex communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to resource allocation for sidelink full duplex communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of resource allocation for sidelink full duplex communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE having multiple TRPs in accordance with examples as disclosed herein. For example, the communications manager 520 may be configured as or otherwise support a means for transmitting, to a base station, a message including a request for a first set of resources for sidelink communications by the UE and an indication of a self-interference measurement by the UE using the first set of resources. The communications manager 520 may be configured as or otherwise support a means for receiving, from the base station, a grant scheduling the first set of resources for the UE based on the message. The communications manager 520 may be configured as or otherwise support a means for measuring, in the first set of resources, self-interference between a first set of antenna components of a first TRP of the UE configuring for transmission and a second set of antenna components of a second TRP of the UE configured for reception. The communications manager 520 may be configured as or otherwise support a means for transmitting, to the base station, a sidelink feedback message including an indication of a second set of sidelink resources that are available for sidelink full duplex communications by the UE based on the measured self-interference.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing and more efficient utilization of communication resources. For example, the processor of the device 505 may configure one or more fields in a BSR to indicate that the device 505 intends to perform self-interference measurement for a transmission requested via the BSR, which may provide for efficient utilization of communication resources. The processor of the device 505 may initiate full duplex communications when the self-interference measurement is relatively low, and may refrain from performing full duplex communications when the self-interference measurement is relatively high. Thus, the processor may refrain from processing significant self-interference, processing multiple repeated transmissions, or both.

Figure 6:
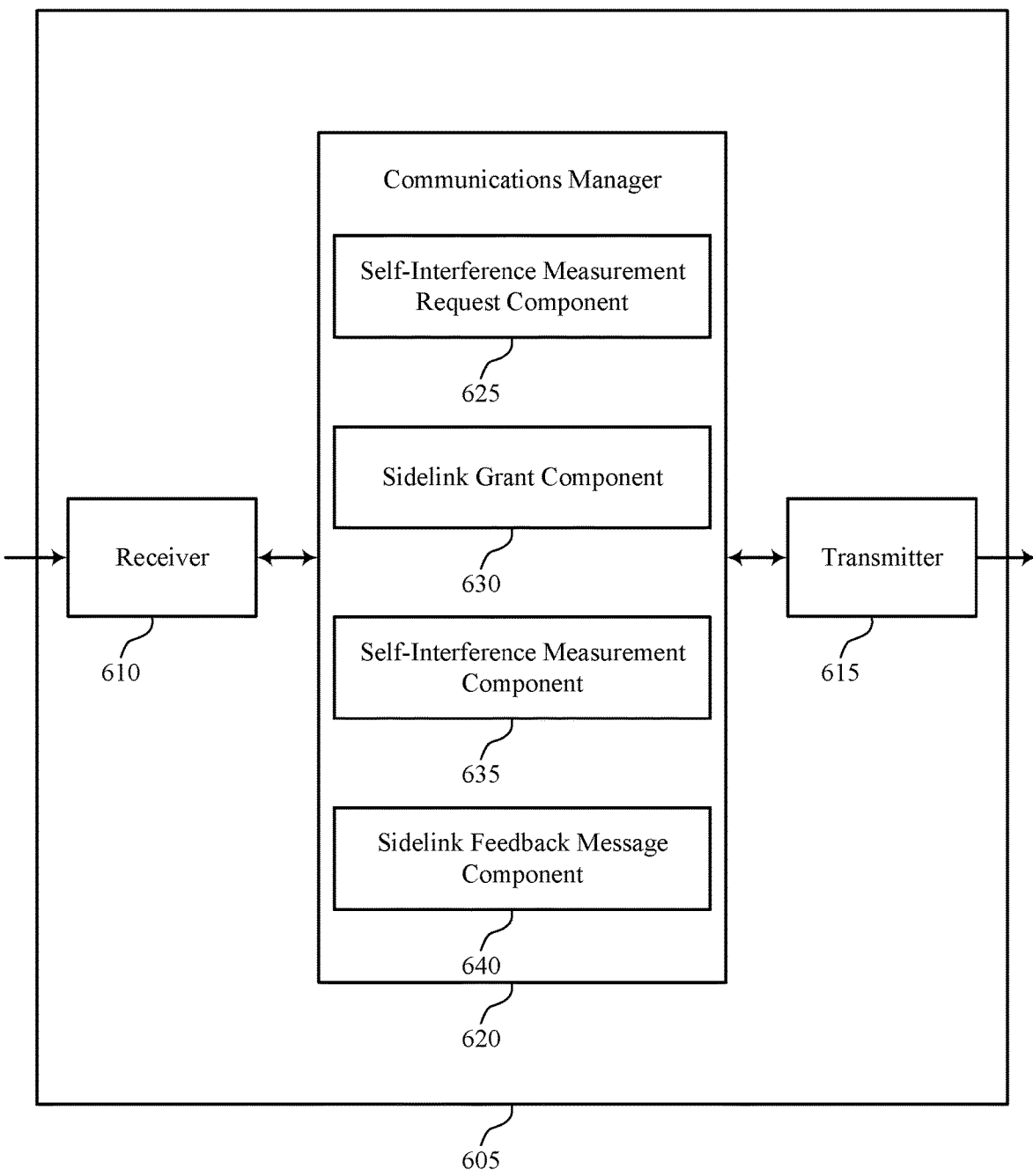

FIG. 6 shows a block diagram 600 of a device 605 that supports resource allocation for sidelink full duplex communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to resource allocation for sidelink full duplex communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to resource allocation for sidelink full duplex communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of resource allocation for sidelink full duplex communications as described herein. For example, the communications manager 620 may include a self-interference measurement request component 625, a sidelink grant component 630, a self-interference measurement component 635, a sidelink feedback message component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE having multiple TRPs in accordance with examples as disclosed herein. The self-interference measurement request component 625 may be configured as or otherwise support a means for transmitting, to a base station, a message including a request for a first set of resources for sidelink communications by the UE and an indication of a self-interference measurement by the UE using the first set of resources. The sidelink grant component 630 may be configured as or otherwise support a means for receiving, from the base station, a grant scheduling the first set of resources for the UE based on the message. The self-interference measurement component 635 may be configured as or otherwise support a means for measuring, in the first set of resources, self-interference between a first set of antenna components of a first TRP of the UE configured for transmission and a second set of antenna components of a second TRP of the UE configured for reception. The sidelink feedback message component 640 may be configured as or otherwise support a means for transmitting, to the base station, a sidelink feedback message including an indication of a second set of sidelink resources that are available for sidelink full duplex communications by the UE based on the measured self-interference.

Figure 7:
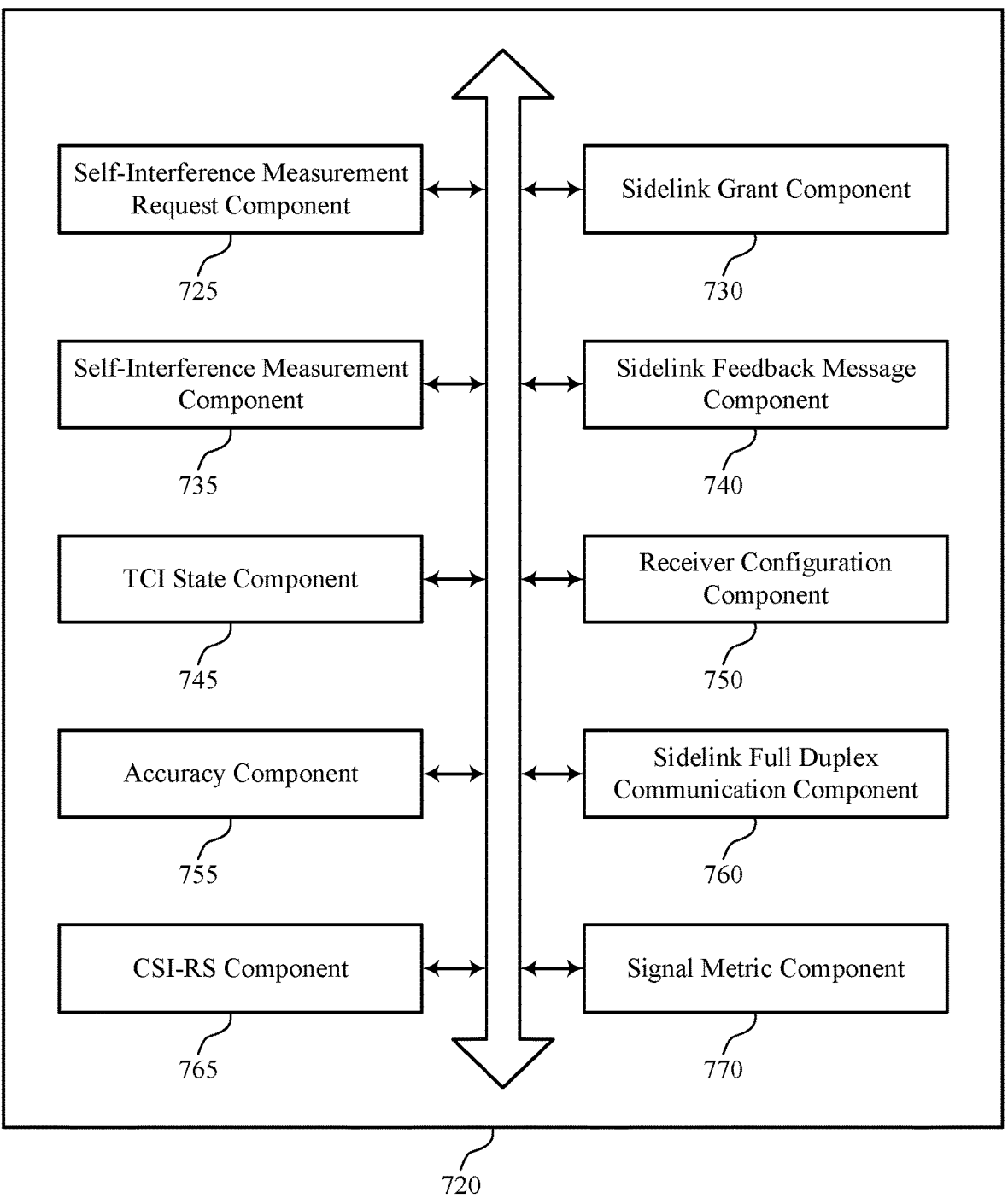
FIG. 7 shows a block diagram of a communications manager that supports resource allocation for sidelink full duplex communications in accordance with aspects of the present disclosure.

FIG. 7 shows a block diagram 700 of a communications manager 720 that supports resource allocation for sidelink full duplex communications in accordance with aspects of the present disclosure. The communications manager 720 may be an example of aspects of a communications manager 520, a communications manager 620, or both, as described herein. The communications manager 720, or various components thereof, may be an example of means for performing various aspects of resource allocation for sidelink full duplex communications as described herein. For example, the communications manager 720 may include a self-interference measurement request component 725, a sidelink grant component 730, a self-interference measurement component 735, a sidelink feedback message component 740, a TCI state component 745, a receiver configuration component 750, an accuracy component 755, a sidelink full duplex communication component 760, a CSI-RS component 765, a signal metric component 770, or any combination thereof. Each of these components may communicate, directly or indirectly, with one another (e.g., via one or more buses).

The communications manager 720 may support wireless communications at a UE having multiple TRPs in accordance with examples as disclosed herein. The self-interference measurement request component 725 may be configured as or otherwise support a means for transmitting, to a base station, a message including a request for a first set of resources for sidelink communications by the UE and an indication of a self-interference measurement by the UE using the first set of resources. The sidelink grant component 730 may be configured as or otherwise support a means for receiving, from the base station, a grant scheduling the first set of resources for the UE based on the message. The self-interference measurement component 735 may be configured as or otherwise support a means for measuring, in the first set of resources, self-interference between a first set of antenna components of a first TRP of the UE configured for transmission and a second set of antenna components of a second TRP of the UE configured for reception. The sidelink feedback message component 740 may be configured as or otherwise support a means for transmitting, to the base station, a sidelink feedback message including an indication of a second set of sidelink resources that are available for sidelink full duplex communications by the UE based on the measured self-interference.

In some examples, to support transmitting the message, the TCI state component 745 may be configured as or otherwise support a means for transmitting, to the base station via the message, a TCI state of the UE for transmission of the sidelink communications by the UE. In some examples, to support transmitting the message, the receiver configuration component 750 may be configured as or otherwise support a means for transmitting, to the base station via the message, a spatial receiver configuration for performing the self-interference measurement by the UE and for reception of future sidelink messages by the UE, where the spatial receiver configuration indicates a receive beam associated with the second TRP of the UE.

In some examples, sidelink grant component 730 may be configured as or otherwise support a means for receiving, from the base station, the grant indicating an accuracy of the first set of resources, where the first set of resources are sidelink resources and the accuracy of the first set of resources is based on scheduling information for the first set of resources and one or more other sidelink resources scheduled by the base station. In some examples, the self-interference measurement component 735 may be configured as or otherwise support a means for measuring the self-interference in the first set of resources based on the accuracy of the first set of resources.

In some examples, the self-interference measurement component 735 may be configured as or otherwise support a means for transmitting, to the base station via the message, a time occasion for performing the self-interference measurement by the UE, where the first set of resources and the accuracy of the first set of resources are based on the time occasion.

In some examples, the sidelink feedback message component 740 may be configured as or otherwise support a means for transmitting, to the base station via the sidelink feedback message, an ID of the UE, where the ID of the UE corresponds to a destination ID of a sidelink message for reception by the UE. In some examples, the sidelink grant component 730 may be configured as or otherwise support a means for receiving, from the base station, a second grant scheduling sidelink resources for the sidelink full duplex communications by the UE based on the ID of the UE corresponding to the destination ID of the sidelink message for reception by the UE.

In some examples, the sidelink grant component 730 may be configured as or otherwise support a means for receiving, from the base station, a second grant scheduling a third set of sidelink resources for the sidelink full duplex communications by the UE, where the third set of sidelink resources are at least partially overlapping with the second set of sidelink resources based on the sidelink feedback message. In some examples, the sidelink full duplex communication component 760 may be configured as or otherwise support a means for performing the sidelink full duplex communications in the third set of sidelink resources based on the second grant. In some examples, to perform the sidelink full duplex communications, the sidelink full duplex communication component 760 may be configured as or otherwise support a means for receiving, from a second UE, a first sidelink message via the third set of sidelink resources, where the first sidelink message is received at the second TRP of the UE and the sidelink full duplex communication component 760 may be configured as or otherwise support a means for transmitting, to a third UE, a second sidelink message via the third set of sidelink resources, where the second sidelink message is transmitted via the first TRP of the UE.

In some examples, the CSI-RS component 765 may be configured as or otherwise support a means for identifying, based on a configuration for the UE, that the first set of resources includes a sequence of CSI-RS resources that is configured for the self-interference measurement. In some examples, the self-interference measurement component 735 may be configured as or otherwise support a means for measuring the self-interference using the sequence of the CSI-RS resources based on the identifying.

In some examples, to support measuring the self-interference, the CSI-RS component 765 may be configured as or otherwise support a means for transmitting signaling via the sequence of the CSI-RS resources using the first TRP of the UE. In some examples, to support measuring the self-interference, the self-interference measurement component 735 may be configured as or otherwise support a means for measuring the self-interference based on the transmitting.

In some examples, to support measuring the self-interference, the CSI-RS component 765 may be configured as or otherwise support a means for transmitting, to a second UE, a self-interference measurement configuration indicating the sequence of the CSI-RS resources for the self-interference measurement by the UE and a set of TCI states for communicating with the second UE. In some examples, to support measuring the self-interference, the CSI-RS component 765 may be configured as or otherwise support a means for transmitting, to the second UE using the set of TCI states, signaling via the sequence of the CSI-RS resources. In some examples, to support measuring the self-interference, the signal metric component 770 may be configured as or otherwise support a means for receiving, from the second UE, a report message indicating a measured signal metric level associated with the signaling via the sequence of the CSI-RS resources. In some examples, to support measuring the self-interference, the TCI state component 745 may be configured as or otherwise support a means for updating one or more TCI states of the set of TCI states for communicating with the second UE based on the measured signal metric level. In some examples, to support measuring the self-interference, the self-interference measurement component 735 may be configured as or otherwise support a means for measuring the self-interference based on transmitting the signaling via the sequence of the CSI-RS resources.

In some examples, the self-interference measurement component 735 may be configured as or otherwise support a means for determining that the self-interference between the first set of antenna components of the first TRP of the UE configured for transmission and the second set of antenna components of the second TRP of the UE configured for reception will be below a self-interference threshold for the sidelink full duplex communications in the second set of sidelink resources based on the measured self-interference. In some examples, the sidelink feedback message component 740 may be configured as or otherwise support a means for transmitting, to the base station via the sidelink feedback message, the indication of the second set of sidelink resources based on the determining.

In some examples, the measured self-interference is based on a first RSRP associated with a first signal transmitted via the first set of antenna components of the first TRP of the UE and a second RSRP associated with a second signal received at the second set of antenna components of the second TRP of the UE, the second signal based on the first signal.

Figure 8:
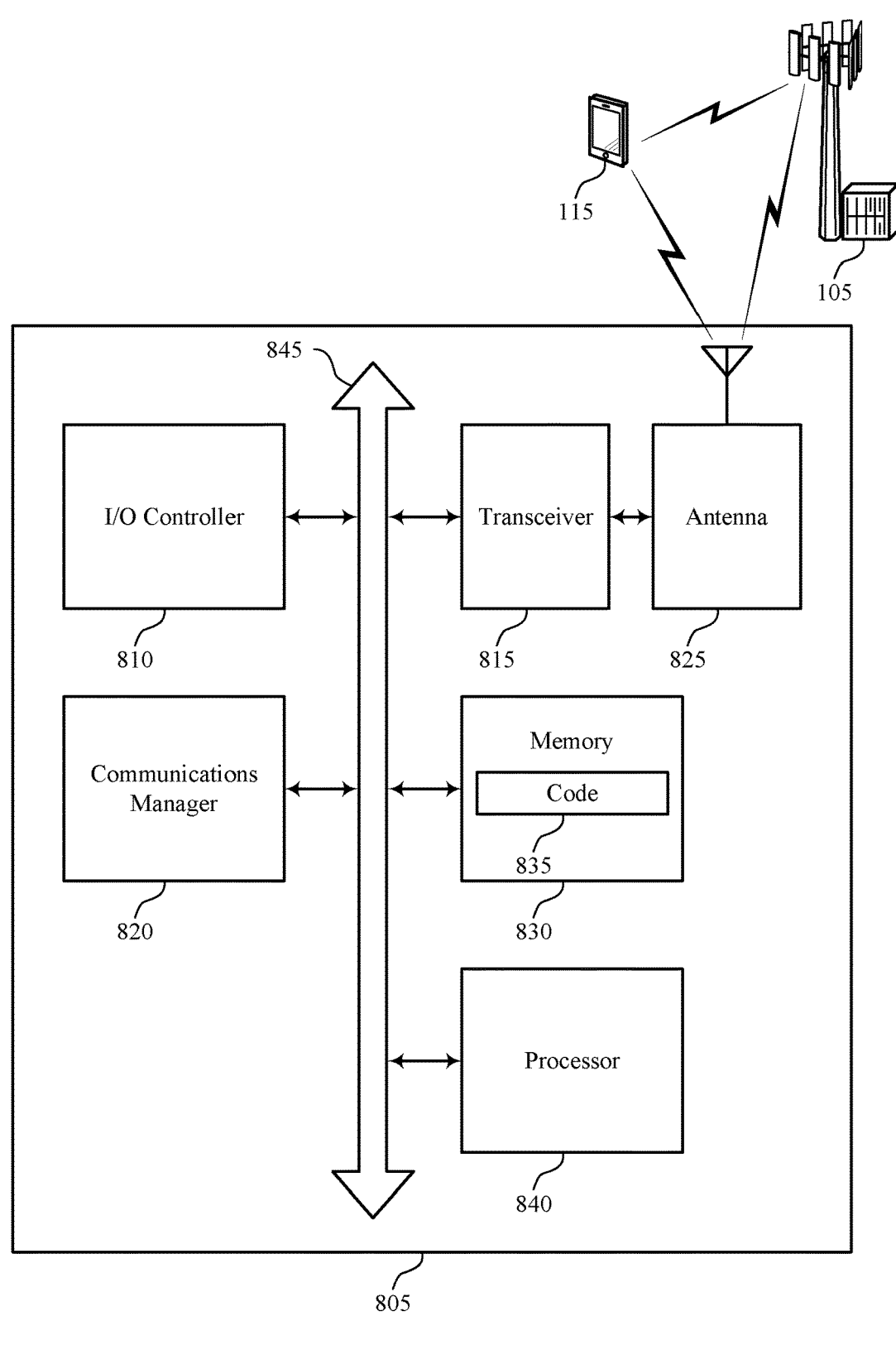
FIG. 8 shows a diagram of a system including a device that supports resource allocation for sidelink full duplex communications in accordance with aspects of the present disclosure.

FIG. 8 shows a diagram of a system 800 including a device 805 that supports resource allocation for sidelink full duplex communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting resource allocation for sidelink full duplex communications). For example, the device 805 or a component of the device 805 may include a processor 840 and memory 830 coupled to the processor 840, the processor 840 and memory 830 configured to perform various functions described herein.

The communications manager 820 may support wireless communications at a UE having multiple TRPs in accordance with examples as disclosed herein. For example, the communications manager 820 may be configured as or otherwise support a means for transmitting, to a base station, a message including a request for a first set of resources for sidelink communications by the UE and an indication of a self-interference measurement by the UE using the first set of resources. The communications manager 820 may be configured as or otherwise support a means for receiving, from the base station, a grant scheduling the first set of resources for the UE based on the message. The communications manager 820 may be configured as or otherwise support a means for measuring, in the first set of resources, self-interference between a first set of antenna components of a first TRP of the UE configuring for transmission and a second set of antenna components of a second TRP of the UE configured for reception. The communications manager 820 may be configured as or otherwise support a means for transmitting, to the base station, a sidelink feedback message including an indication of a second set of sidelink resources that are available for sidelink full duplex communications by the UE based on the measured self-interference.

By including or configuring the communications manager 820 in accordance with examples as described herein, the device 805 may support techniques for improved communication reliability, reduced latency, and improved coordination between devices. For example, the device 805 (e.g., a UE 115) may measure self-interference to determine whether to initiate sidelink full duplex communications, which may provide for the device 805 to refrain from performing full duplex communications that may result in significant self-interference at the device 805. The device 805 may thereby communicate in a full duplex mode (e.g., SFFD mode) to improve a link capacity and throughput of communications by the device without incurring significant self-interference, which may reduce latency and improve a reliability of sidelink communications by the device 805. Additionally or alternatively, the device may improve coordination between devices (e.g., between a base station 105 and a UE 115) by indicating, via a BSR transmitted to a base station 105, that the device 805 intends to perform self-interference for a requested transmission and communicating sidelink feedback information to the base station 105 that may initiate sidelink full duplex communications based on the measured self-interference.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of resource allocation for sidelink full duplex communications as described herein, or the processor 840 and the memory 830 may be otherwise configured to perform or support such operations.

Figure 9:
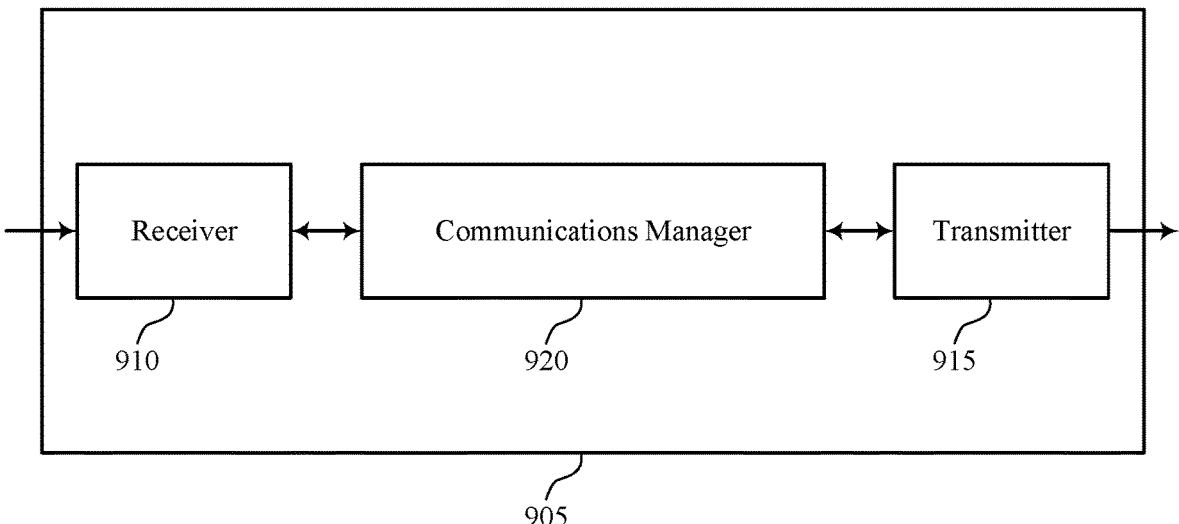
FIGS. 9 and 10 show block diagrams of devices that support resource allocation for sidelink full duplex communications in accordance with aspects of the present disclosure.

FIG. 9 shows a block diagram 900 of a device 905 that supports resource allocation for sidelink full duplex communications in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to resource allocation for sidelink full duplex communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to resource allocation for sidelink full duplex communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of resource allocation for sidelink full duplex communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for receiving, from a UE having multiple TRPs, a message including a request for a first set of resources for sidelink communications by the UE and an indication of a self-interference measurement between the multiple TRPs of the UE using the first set of resources. The communications manager 920 may be configured as or otherwise support a means for transmitting, to the UE, a first grant scheduling the first set of resources for the UE based on the message. The communications manager 920 may be configured as or otherwise support a means for receiving, from the UE, a sidelink feedback message including an indication of a second set of sidelink resources that are available for sidelink full duplex communications by the UE. The communications manager 920 may be configured as or otherwise support a means for transmitting, to the UE, a second grant scheduling a third set of sidelink resources for the sidelink full duplex communications by the UE based on the sidelink feedback message, where the third set of sidelink resources are at least partially overlapping with the second set of sidelink resources.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources. For example, a processor of the device 905 (e.g., a base station) may receive a single message (e.g., a BSR, an SR, or the like) from a UE that may include a request for resources and an indication of a self-interference measurement to be performed by the UE using the resources. By receiving the indication of the self-interference measurement via a BSR, the processor of the device may support techniques for more efficient utilization of communication resources.

Figure 10:
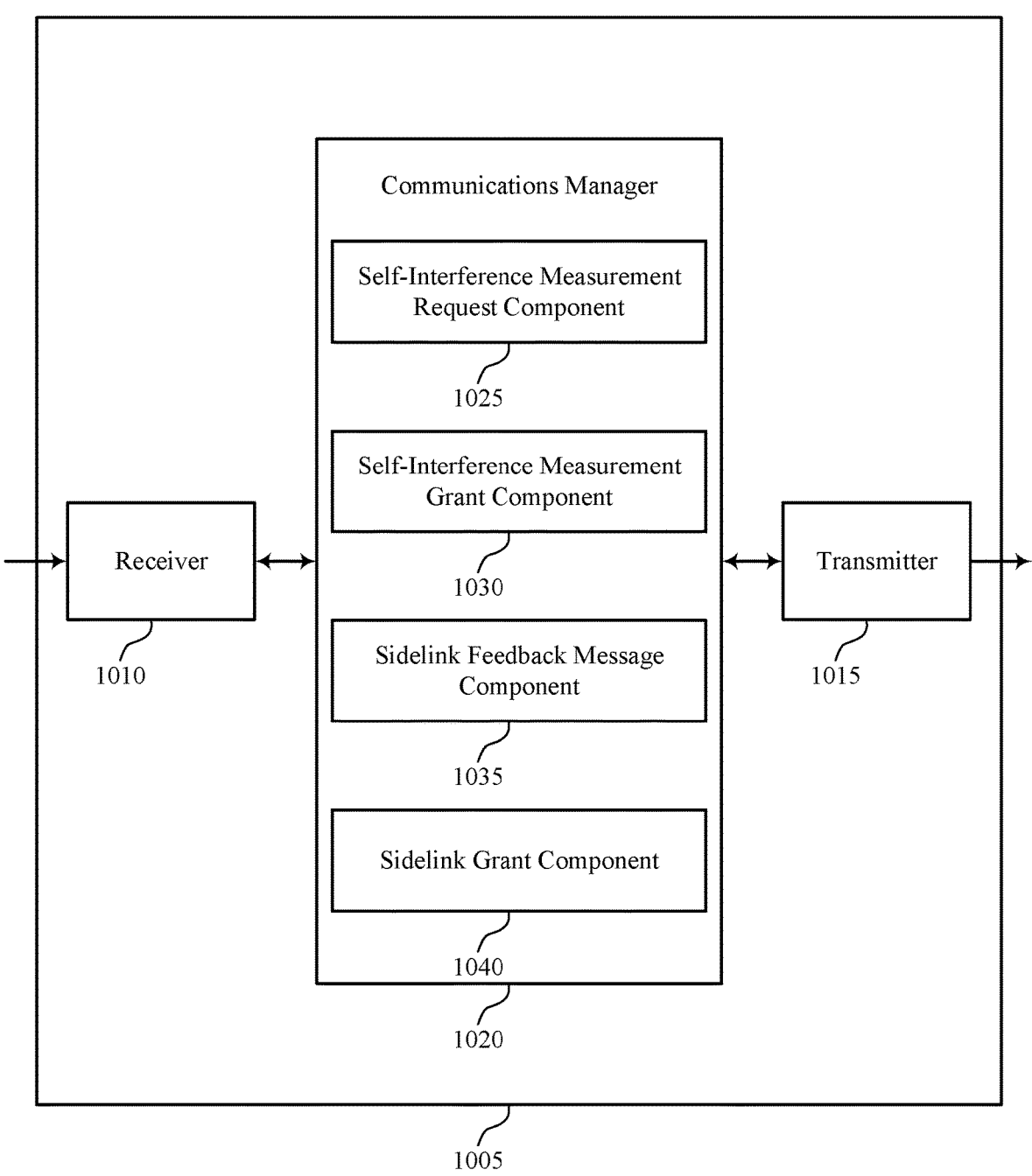

FIG. 10 shows a block diagram 1000 of a device 1005 that supports resource allocation for sidelink full duplex communications in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to resource allocation for sidelink full duplex communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to resource allocation for sidelink full duplex communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of resource allocation for sidelink full duplex communications as described herein. For example, the communications manager 1020 may include a self-interference measurement request component 1025, a self-interference measurement grant component 1030, a sidelink feedback message component 1035, a sidelink grant component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The self-interference measurement request component 1025 may be configured as or otherwise support a means for receiving, from a UE having multiple TRPs, a message including a request for a first set of resources for sidelink communications by the UE and an indication of a self-interference measurement between the multiple TRPs of the UE using the first set of resources. The self-interference measurement grant component 1030 may be configured as or otherwise support a means for transmitting, to the UE, a first grant scheduling the first set of resources for the UE based on the message. The sidelink feedback message component 1035 may be configured as or otherwise support a means for receiving, from the UE, a sidelink feedback message including an indication of a second set of sidelink resources that are available for sidelink full duplex communications by the UE. The sidelink grant component 1040 may be configured as or otherwise support a means for transmitting, to the UE, a second grant scheduling a third set of sidelink resources for the sidelink full duplex communications by the UE based on the sidelink feedback message, where the third set of sidelink resources are at least partially overlapping with the second set of sidelink resources.

Figure 11:
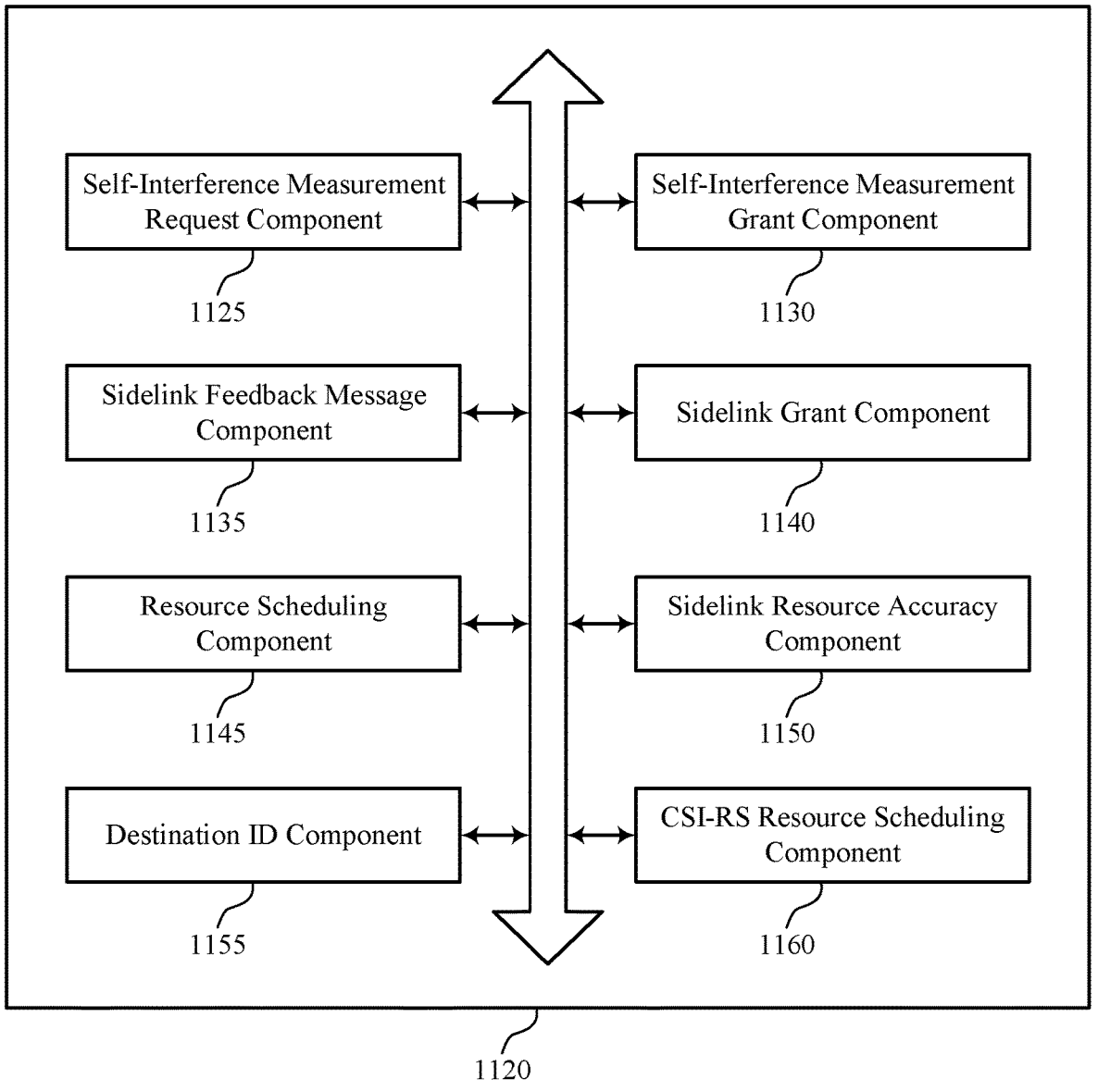
FIG. 11 shows a block diagram of a communications manager that supports resource allocation for sidelink full duplex communications in accordance with aspects of the present disclosure.

FIG. 11 shows a block diagram 1100 of a communications manager 1120 that supports resource allocation for sidelink full duplex communications in accordance with aspects of the present disclosure. The communications manager 1120 may be an example of aspects of a communications manager 920, a communications manager 1020, or both, as described herein. The communications manager 1120, or various components thereof, may be an example of means for performing various aspects of resource allocation for sidelink full duplex communications as described herein. For example, the communications manager 1120 may include a self-interference measurement request component 1125, a self-interference measurement grant component 1130, a sidelink feedback message component 1135, a sidelink grant component 1140, a resource scheduling component 1145, a sidelink resource accuracy component 1150, a destination ID component 1155, a CSI-RS resource scheduling component 1160, or any combination thereof. Each of these components may communicate, directly or indirectly, with one another (e.g., via one or more buses).

The communications manager 1120 may support wireless communications at a base station in accordance with examples as disclosed herein. The self-interference measurement request component 1125 may be configured as or otherwise support a means for receiving, from a UE having multiple TRPs, a message including a request for a first set of resources for sidelink communications by the UE and an indication of a self-interference measurement between the multiple TRPs of the UE using the first set of resources. The self-interference measurement grant component 1130 may be configured as or otherwise support a means for transmitting, to the UE, a first grant scheduling the first set of resources for the UE based on the message. The sidelink feedback message component 1135 may be configured as or otherwise support a means for receiving, from the UE, a sidelink feedback message including an indication of a second set of sidelink resources that are available for sidelink full duplex communications by the UE. The sidelink grant component 1140 may be configured as or otherwise support a means for transmitting, to the UE, a second grant scheduling a third set of sidelink resources for the sidelink full duplex communications by the UE based on the sidelink feedback message, where the third set of sidelink resources are at least partially overlapping with the second set of sidelink resources.

In some examples, the resource scheduling component 1145 may be configured as or otherwise support a means for identifying one or more resources of the second set of sidelink resources that are available for the sidelink communications by the UE based on an interference associated with the one or more resources, where the third set of sidelink resources includes the one or more resources that are available for the sidelink communications by the UE.

In some examples, the self-interference measurement request component 1125 may be configured as or otherwise support a means for receiving, from the UE, the message including a TCI state of the UE for transmission of the sidelink communications and a spatial receiver configuration for the self-interference measurement by the UE and for future sidelink data reception by the UE, where the spatial receiver configuration indicates a receive beam associated with a TRP of the UE that is configured for reception. In some examples, the self-interference measurement grant component 1130 may be configured as or otherwise support a means for transmitting the first grant scheduling the first set of resources based on the TCI state and the spatial receiver configuration.

In some examples, the sidelink resource accuracy component 1150 may be configured as or otherwise support a means for determining an accuracy of the first set of resources based on scheduling information for the first set of resources and one or more other sidelink resources scheduled by the base station, where the first set of resources are sidelink resources, and where the scheduling information indicates an interference associated with the first set of resources. In some examples, the self-interference measurement grant component 1130 may be configured as or otherwise support a means for transmitting, to the UE, the first grant indicating the accuracy of the first set of resources based on the determining.

In some examples, the self-interference measurement request component 1125 may be configured as or otherwise support a means for receiving, from the UE, the message, where the message indicates a time occasion for performing the self-interference measurement. In some examples, the sidelink resource accuracy component 1150 may be configured as or otherwise support a means for determining the accuracy of the first set of resources based on the scheduling information and the time occasion.

In some examples, the sidelink feedback message component 1135 may be configured as or otherwise support a means for receiving, from the UE, the sidelink feedback message including an ID of the UE. In some examples, the destination ID component 1155 may be configured as or otherwise support a means for identifying a sidelink message including a destination ID that corresponds to the ID of the UE. In some examples, the sidelink grant component 1140 may be configured as or otherwise support a means for scheduling, via the second grant, one or more sidelink resources of the third set of sidelink resources for transmission of the sidelink message to the UE based on the identifying. In some examples, the one or more sidelink resources for the transmission of the sidelink message are reconfigured sidelink resources.

In some examples, the CSI-RS resource scheduling component 1160 may be configured as or otherwise support a means for identifying a sequence of CSI-RS resources that is configured for the self-interference measurement by the UE. In some examples, the CSI-RS resource scheduling component 1160 may be configured as or otherwise support a means for transmitting, to the UE, the first grant scheduling the first set of resources for the UE, where the first set of resources include the sequence of the CSI-RS resources.

Figure 12:
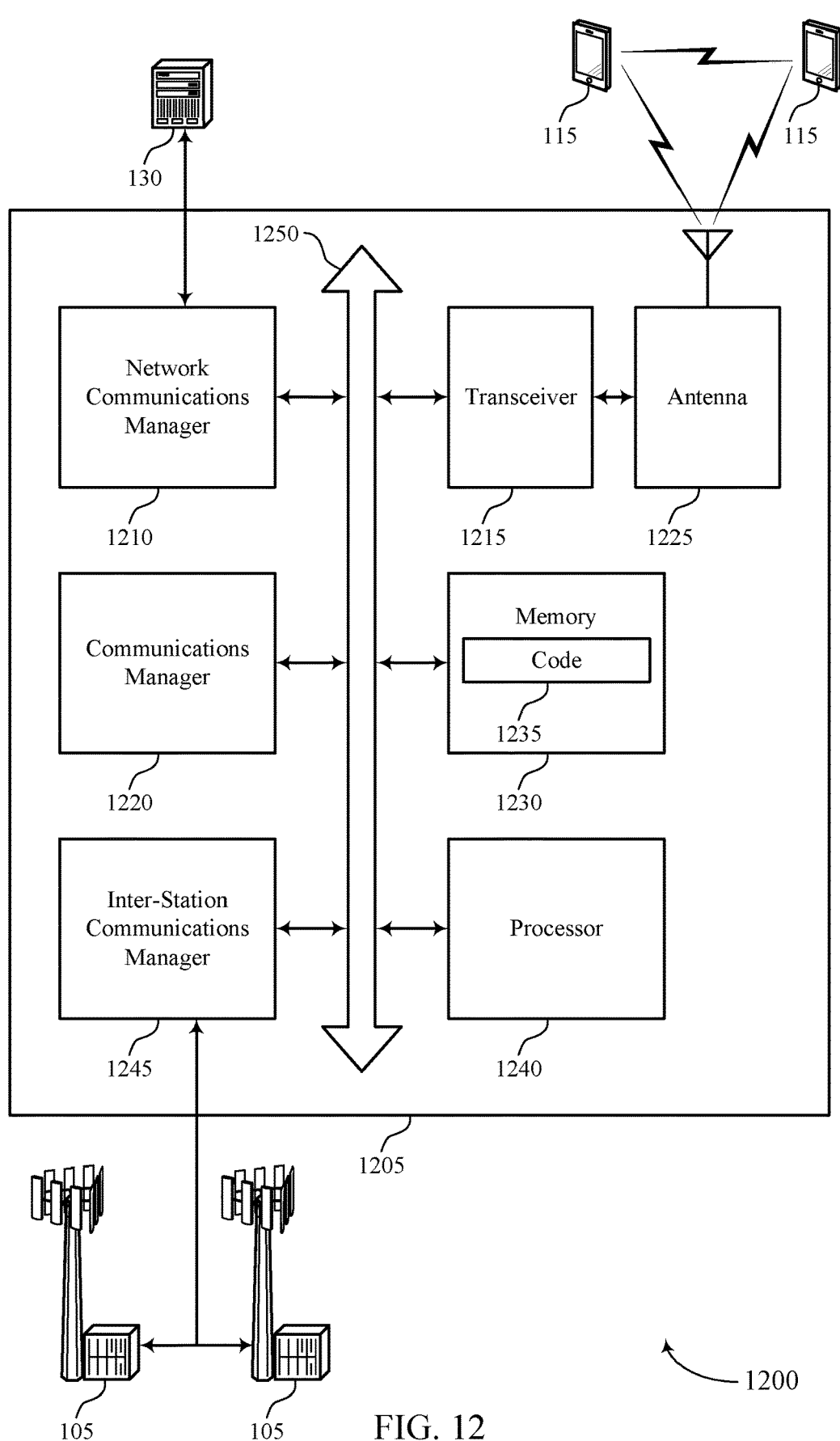
FIG. 12 shows a diagram of a system including a device that supports resource allocation for sidelink full duplex communications in accordance with aspects of the present disclosure.

FIG. 12 shows a diagram of a system 1200 including a device 1205 that supports resource allocation for sidelink full duplex communications in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting resource allocation for sidelink full duplex communications). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for receiving, from a UE having multiple TRPs, a message including a request for a first set of resources for sidelink communications by the UE and an indication of a self-interference measurement between the multiple TRPs of the UE using the first set of resources. The communications manager 1220 may be configured as or otherwise support a means for transmitting, to the UE, a first grant scheduling the first set of resources for the UE based on the message. The communications manager 1220 may be configured as or otherwise support a means for receiving, from the UE, a sidelink feedback message including an indication of a second set of sidelink resources that are available for sidelink full duplex communications by the UE. The communications manager 1220 may be configured as or otherwise support a means for transmitting, to the UE, a second grant scheduling a third set of sidelink resources for the sidelink full duplex communications by the UE based on the sidelink feedback message, where the third set of sidelink resources are at least partially overlapping with the second set of sidelink resources.

By including or configuring the communications manager 1220 in accordance with examples as described herein, the device 1205 may support techniques for improved communication reliability, reduced latency, and improved coordination between devices. For example, the device 1205 (e.g., a base station) may identify and schedule accurate (e.g., interference-free) resources for a UE to use for performing a self-interference measurement, which may allow for the UE to perform an accurate self-interference measurement. In some examples, the device 1205 may indicate an accuracy or feasibility of the resources to the UE via a respective grant, which may improve coordination between devices and reliability of the self-interference measurement. Additionally or alternatively, by scheduling resources for sidelink full duplex communications by a UE based on a sidelink feedback message received from the UE, the device 1205 may refrain from scheduling communications with relatively high interference, which may improve reliability and reduce latency associated with sidelink communications.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of resource allocation for sidelink full duplex communications as described herein, or the processor 1240 and the memory 1230 may be otherwise configured to perform or support such operations.

FIG. 13 shows a flowchart illustrating a method 1300 that supports resource allocation for sidelink full duplex communications in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station, a message including a request for a first set of resources for sidelink communications by the UE and an indication of a self-interference measurement by the UE using the first set of resources. The operations of 1305 may be performed in accordance with examples as disclosed herein. In some examples, aspects of the operations of 1305 may be performed by a self-interference measurement request component 725 as described with reference to FIG. 7.

At 1310, the method may include receiving, from the base station, a grant scheduling the first set of resources for the UE based on the message. The operations of 1310 may be performed in accordance with examples as disclosed herein. In some examples, aspects of the operations of 1310 may be performed by a sidelink grant component 730 as described with reference to FIG. 7.

At 1315, the method may include measuring, in the first set of resources, self-interference between a first set of antenna components of a first TRP of the UE configured for transmission and a second set of antenna components of a second TRP of the UE configured for reception. The operations of 1315 may be performed in accordance with examples as disclosed herein. In some examples, aspects of the operations of 1315 may be performed by a self-interference measurement component 735 as described with reference to FIG. 7.

At 1320, the method may include transmitting, to the base station, a sidelink feedback message including an indication of a second set of sidelink resources that are available for sidelink full duplex communications by the UE based on the measured self-interference. The operations of 1320 may be performed in accordance with examples as disclosed herein. In some examples, aspects of the operations of 1320 may be performed by a sidelink feedback message component 740 as described with reference to FIG. 7.

FIG. 14 shows a flowchart illustrating a method 1400 that supports resource allocation for sidelink full duplex communications in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, a message including a request for a first set of resources for sidelink communications by the UE and an indication of a self-interference measurement by the UE using the first set of resources. The operations of 1405 may be performed in accordance with examples as disclosed herein. In some examples, aspects of the operations of 1405 may be performed by a self-interference measurement request component 725 as described with reference to FIG. 7.

At 1410, the method may include transmitting, to the base station via the message, a TCI state of the UE for transmission of the sidelink communications by the UE. The operations of 1410 may be performed in accordance with examples as disclosed herein. In some examples, aspects of the operations of 1410 may be performed by a TCI state component 745 as described with reference to FIG. 7.

At 1415, the method may include transmitting, to the base station via the message, a spatial receiver configuration for performing the self-interference measurement by the UE and for reception of future sidelink messages by the UE, where the spatial receiver configuration indicates a receive beam associated with the second TRP of the UE. The operations of 1415 may be performed in accordance with examples as disclosed herein. In some examples, aspects of the operations of 1415 may be performed by a receiver configuration component 750 as described with reference to FIG. 7.

At 1420, the method may include receiving, from the base station, a grant scheduling the first set of resources for the UE based on the message. The operations of 1420 may be performed in accordance with examples as disclosed herein. In some examples, aspects of the operations of 1420 may be performed by a sidelink grant component 730 as described with reference to FIG. 7.

At 1425, the method may include measuring, in the first set of resources, self-interference between a first set of antenna components of a first TRP of the UE configured for transmission and a second set of antenna components of a second TRP of the UE configured for reception. The operations of 1425 may be performed in accordance with examples as disclosed herein. In some examples, aspects of the operations of 1425 may be performed by a self-interference measurement component 735 as described with reference to FIG. 7.

At 1430, the method may include transmitting, to the base station, a sidelink feedback message including an indication of a second set of sidelink resources that are available for sidelink full duplex communications by the UE based on the measured self-interference. The operations of 1430 may be performed in accordance with examples as disclosed herein. In some examples, aspects of the operations of 1430 may be performed by a sidelink feedback message component 740 as described with reference to FIG. 7.

Figure 15:
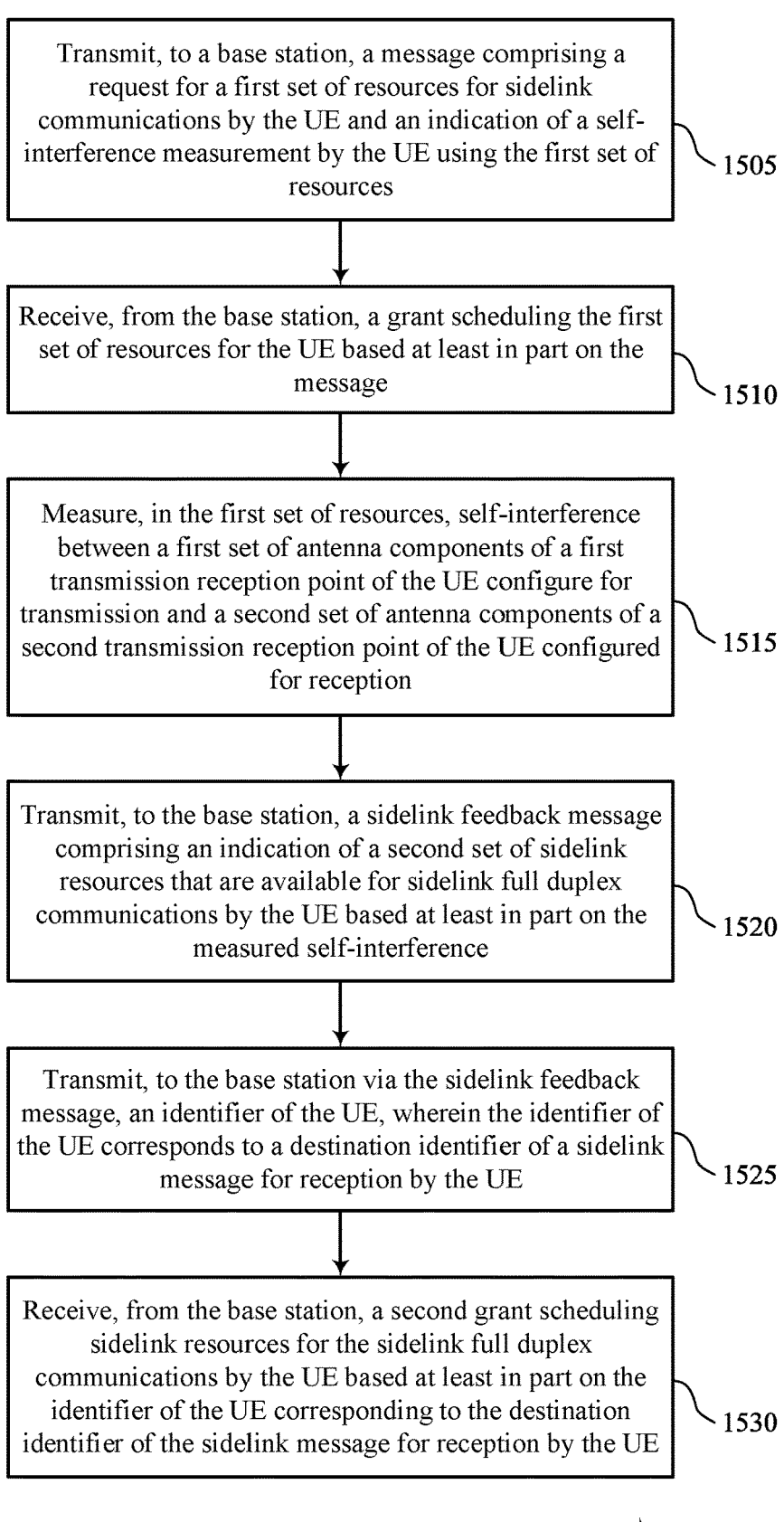

FIG. 15 shows a flowchart illustrating a method 1500 that supports resource allocation for sidelink full duplex communications in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting, to a base station, a message including a request for a first set of resources for sidelink communications by the UE and an indication of a self-interference measurement by the UE using the first set of resources. The operations of 1505 may be performed in accordance with examples as disclosed herein. In some examples, aspects of the operations of 1505 may be performed by a self-interference measurement request component 725 as described with reference to FIG. 7.

At 1510, the method may include receiving, from the base station, a grant scheduling the first set of resources for the UE based on the message. The operations of 1510 may be performed in accordance with examples as disclosed herein.

In some examples, aspects of the operations of 1510 may be performed by a sidelink grant component 730 as described with reference to FIG. 7.

At 1515, the method may include measuring, in the first set of resources, self-interference between a first set of antenna components of a first TRP of the UE configured for transmission and a second set of antenna components of a second TRP of the UE configured for reception. The operations of 1515 may be performed in accordance with examples as disclosed herein. In some examples, aspects of the operations of 1515 may be performed by a self-interference measurement component 735 as described with reference to FIG. 7.

At 1520, the method may include transmitting, to the base station, a sidelink feedback message including an indication of a second set of sidelink resources that are available for sidelink full duplex communications by the UE based on the measured self-interference. The operations of 1520 may be performed in accordance with examples as disclosed herein. In some examples, aspects of the operations of 1520 may be performed by a sidelink feedback message component 740 as described with reference to FIG. 7.

At 1525, the method may include transmitting, to the base station via the sidelink feedback message, an identifier of the UE, where the identifier of the UE corresponds to a destination identifier of a sidelink message for reception by the UE. The operations of 1525 may be performed in accordance with examples as disclosed herein. In some examples, aspects of the operations of 1525 may be performed by a sidelink feedback message component 740 as described with reference to FIG. 7.

At 1530, the method may include receiving, from the base station, a second grant scheduling sidelink resources for the sidelink full duplex communications by the UE based on the identifier of the UE corresponding to the destination identifier of the sidelink message for reception by the UE. The operations of 1530 may be performed in accordance with examples as disclosed herein. In some examples, aspects of the operations of 1530 may be performed by a sidelink grant component 730 as described with reference to FIG. 7.

FIG. 16 shows a flowchart illustrating a method 1600 that supports resource allocation for sidelink full duplex communications in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, from a UE having multiple TRPs, a message including a request for a first set of resources for sidelink communications by the UE and an indication of a self-interference measurement between the multiple TRPs of the UE using the first set of resources. The operations of 1605 may be performed in accordance with examples as disclosed herein. In some examples, aspects of the operations of 1605 may be performed by a self-interference measurement request component 1125 as described with reference to FIG. 11.

At 1610, the method may include transmitting, to the UE, a first grant scheduling the first set of resources for the UE based on the message. The operations of 1610 may be performed in accordance with examples as disclosed herein.

In some examples, aspects of the operations of 1610 may be performed by a self-interference measurement grant component 1130 as described with reference to FIG. 11.

At 1615, the method may include receiving, from the UE, a sidelink feedback message including an indication of a second set of sidelink resources that are available for sidelink full duplex communications by the UE. The operations of 1615 may be performed in accordance with examples as disclosed herein. In some examples, aspects of the operations of 1615 may be performed by a sidelink feedback message component 1135 as described with reference to FIG. 11.

At 1620, the method may include transmitting, to the UE, a second grant scheduling a third set of sidelink resources for the sidelink full duplex communications by the UE based on the sidelink feedback message, where the third set of sidelink resources are at least partially overlapping with the second set of sidelink resources. The operations of 1620 may be performed in accordance with examples as disclosed herein. In some examples, aspects of the operations of 1620 may be performed by a sidelink grant component 1140 as described with reference to FIG. 11.

FIG. 17 shows a flowchart illustrating a method 1700 that supports resource allocation for sidelink full duplex communications in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include receiving, from a UE having multiple TRPs, a message including a request for a first set of resources for sidelink communications by the UE and an indication of a self-interference measurement between the multiple TRPs of the UE using the first set of resources. The operations of 1705 may be performed in accordance with examples as disclosed herein. In some examples, aspects of the operations of 1705 may be performed by a self-interference measurement request component 1125 as described with reference to FIG. 11.

At 1710, the method may include determining an accuracy of the first set of resources based on scheduling information for the first set of resources and one or more other sidelink resources scheduled by the base station, where the first set of resources are sidelink resources, and where the scheduling information indicates an interference associated with the first set of resources. The operations of 1710 may be performed in accordance with examples as disclosed herein. In some examples, aspects of the operations of 1710 may be performed by a sidelink resource accuracy component 1150 as described with reference to FIG. 11.

At 1715, the method may include transmitting, to the UE, a first grant scheduling the first set of resources for the UE based on the message. The operations of 1715 may be performed in accordance with examples as disclosed herein. In some examples, aspects of the operations of 1715 may be performed by a self-interference measurement grant component 1130 as described with reference to FIG. 11.

At 1720, the method may include transmitting, to the UE, the first grant indicating the accuracy of the first set of resources based on the determining. The operations of 1720 may be performed in accordance with examples as disclosed herein. In some examples, aspects of the operations of 1720 may be performed by a self-interference measurement grant component 1130 as described with reference to FIG. 11.

At 1725, the method may include receiving, from the UE, a sidelink feedback message including an indication of a second set of sidelink resources that are available for sidelink full duplex communications by the UE. The operations of 1725 may be performed in accordance with examples as disclosed herein. In some examples, aspects of the operations of 1725 may be performed by a sidelink feedback message component 1135 as described with reference to FIG. 11.

At 1730, the method may include transmitting, to the UE, a second grant scheduling a third set of sidelink resources for the sidelink full duplex communications by the UE based on the sidelink feedback message, where the third set of sidelink resources are at least partially overlapping with the second set of sidelink resources. The operations of 1730 may be performed in accordance with examples as disclosed herein. In some examples, aspects of the operations of 1730 may be performed by a sidelink grant component 1140 as described with reference to FIG. 11.

SUMMARY OF ASPECTS

The following provides an overview of aspects of the present disclosure. The following aspects are given by way of illustration. Examples of the following aspects may be combined with examples or embodiments shown or discussed in relation to the figures or elsewhere herein:

Aspect 1: A method for wireless communications at a UE having multiple transmission reception points, the method comprising: transmitting, to a base station, a message comprising a request for a first set of resources for sidelink communications by the UE and an indication of a self-interference measurement by the UE using the first set of resources; receiving, from the base station, a grant scheduling the first set of resources for the UE based at least in part on the message; measuring, in the first set of resources, self-interference between a first set of antenna components of a first transmission reception point of the UE configured for transmission and a second set of antenna components of a second transmission reception point of the UE configured for reception; transmitting, to the base station, a sidelink feedback message comprising an indication of a second set of sidelink resources that are available for sidelink full duplex communications by the UE based at least in part on the measured self-interference.

Aspect 2: The method of aspect 1, wherein transmitting the message further comprises: transmitting, to the base station via the message, a transmission configuration indicator state of the UE for transmission of the sidelink communications by the UE; and transmitting, to the base station via the message, a spatial receiver configuration for performing the self-interference measurement by the UE and for reception of future sidelink messages by the UE, wherein the spatial receiver configuration indicates a receive beam associated with the second transmission reception point of the UE.

Aspect 3: The method of any of aspects 1 through 2, further comprising: receiving, from the base station, the grant indicating an accuracy of the first set of resources, wherein the first set of resources are sidelink resources and the accuracy of the first set of resources is based at least in part on scheduling information for the first set of resources and one or more other sidelink resources scheduled by the base station; and measuring the self-interference in the first set of resources based at least in part on the accuracy of the first set of resources.

Aspect 4: The method of aspect 3, further comprising: transmitting, to the base station via the message, a time occasion for performing the self-interference measurement by the UE, wherein the first set of resources and the accuracy of the first set of resources are based at least in part on the time occasion.

Aspect 5: The method of any of aspects 1 through 4, further comprising: transmitting, to the base station via the sidelink feedback message, an identifier of the UE, wherein the identifier of the UE corresponds to a destination identifier of a sidelink message for reception by the UE; and receiving, from the base station, a second grant scheduling sidelink resources for the sidelink full duplex communications by the UE based at least in part on the identifier of the UE corresponding to the destination identifier of the sidelink message for reception by the UE.

Aspect 6: The method of any of aspects 1 through 5, further comprising: receiving, from the base station, a second grant scheduling a third set of sidelink resources for the sidelink full duplex communications by the UE, wherein the third set of sidelink resources are at least partially overlapping with the second set of sidelink resources based at least in part on the sidelink feedback message; and performing the sidelink full duplex communications in the third set of sidelink resources based at least in part on the second grant, wherein performing the sidelink full duplex communications comprises: receiving, from a second UE, a first sidelink message via the third set of sidelink resources, wherein the first sidelink message is received at the second transmission reception point of the UE; and transmitting, to a third UE, a second sidelink message via the third set of sidelink resources, where the second sidelink message is transmitted via the first transmission reception point of the UE.

Aspect 7: The method of any of aspects 1 through 2 and 6, further comprising: identifying, based at least in part on a configuration for the UE, that the first set of resources comprises a sequence of channel state information reference signal resources that is configured for the self-interference measurement; and measuring the self-interference using the sequence of the channel state information reference signal resources based at least in part on the identifying.

Aspect 8: The method of aspect 7, wherein measuring the self-interference further comprises: transmitting signaling via the sequence of the channel state information reference signal resources using the first transmission reception point of the UE; and measuring the self-interference based at least in part on the transmitting.

Aspect 9: The method of aspect 7, wherein measuring the self-interference further comprises: transmitting, to a second UE, a self-interference measurement configuration indicating the sequence of the channel state information reference signal resources for the self-interference measurement by the UE and a set of transmission configuration indication states for communicating with the second UE; transmitting, to the second UE using the set of transmission configuration indication states, signaling via the sequence of the channel state information reference signal resources; receiving, from the second UE, a report message indicating a measured signal metric level associated with the signaling via the sequence of the channel state information reference signal resources; updating one or more transmission configuration indication states of the set of transmission configuration indication states for communicating with the second UE based at least in part on the measured signal metric level;

and measuring the self-interference based at least in part on transmitting the signaling via the sequence of the channel state information reference signal resources.

Aspect 10: The method of any of aspects 1 through 9, further comprising: determining that the self-interference between the first set of antenna components of the first transmission reception point of the UE configured for transmission and the second set of antenna components of the second transmission reception point of the UE configured for reception will be below a self-interference threshold for the sidelink full duplex communications in the second set of sidelink resources based at least in part on the measured self-interference; and transmitting, to the base station via the sidelink feedback message, the indication of the second set of sidelink resources based at least in part on the determining.

Aspect 11: The method of any of aspects 1 through 10, wherein the measured self-interference is based at least in part on a first reference signal receive power (RSRP) associated with a first signal transmitted via the first set of antenna components of the first transmission reception point of the UE and a second RSRP associated with a second signal received at the second set of antenna components of the second transmission reception point of the UE, the second signal based at least in part on the first signal.

Aspect 12: A method for wireless communications at a base station, comprising: receiving, from a UE having multiple transmission reception points, a message comprising a request for a first set of resources for sidelink communications by the UE and an indication of a self-interference measurement between the multiple transmission reception points of the UE using the first set of resources; transmitting, to the UE, a first grant scheduling the first set of resources for the UE based at least in part on the message; receiving, from the UE, a sidelink feedback message comprising an indication of a second set of sidelink resources that are available for sidelink full duplex communications by the UE; and transmitting, to the UE, a second grant scheduling a third set of sidelink resources for the sidelink full duplex communications by the UE based at least in part on the sidelink feedback message, wherein the third set of sidelink resources are at least partially overlapping with the second set of sidelink resources.

Aspect 13: The method of aspect 12, further comprising: identifying one or more resources of the second set of sidelink resources that are available for the sidelink communications by the UE based at least in part on an interference associated with the one or more resources, wherein the third set of sidelink resources comprises the one or more resources that are available for the sidelink communications by the UE.

Aspect 14: The method of any of aspects 12 through 13, further comprising: receiving, from the UE, the message comprising a transmission configuration indicator state of the UE for transmission of the sidelink communications and a spatial receiver configuration for the self-interference measurement by the UE and for future sidelink data reception by the UE, wherein the spatial receiver configuration indicates a receive beam associated with a transmission reception point of the UE that is configured for reception; and transmitting the first grant scheduling the first set of resources based at least in part on the transmission configuration indicator state and the spatial receiver configuration.

Aspect 15: The method of any of aspects 12 through 14, further comprising: determining an accuracy of the first set of resources based at least in part on scheduling information for the first set of resources and one or more other sidelink resources scheduled by the base station, wherein the first set of resources are sidelink resources and the scheduling information indicates an interference associated with the first set of resources; and transmitting, to the UE, the first grant indicating the accuracy of the first set of resources based at least in part on the determining.

Aspect 16: The method of aspect 15, further comprising: receiving, from the UE, the message, wherein the message indicates a time occasion for performing the self-interference measurement; and determining the accuracy of the first set of resources based at least in part on the scheduling information and the time occasion.

Aspect 17: The method of any of aspects 12 through 16, further comprising: receiving, from the UE, the sidelink feedback message comprising an identifier of the UE; identifying a sidelink message comprising a destination identifier that corresponds to the identifier of the UE; and scheduling, via the second grant, one or more sidelink resources of the third set of sidelink resources for transmission of the sidelink message to the UE based at least in part on the identifying.

Aspect 18: The method of aspect 17, wherein the one or more sidelink resources for the transmission of the sidelink message are reconfigured sidelink resources.

Aspect 19: The method of any of aspects 12 through 13 and 17 through 18, further comprising: identifying a sequence of channel state information reference signal resources that is configured for the self-interference measurement by the UE; and transmitting, to the UE, the first grant scheduling the first set of resources for the UE, wherein the first set of resources comprise the sequence of the channel state information reference signal resources.

Aspect 20: An apparatus for wireless communications at a UE having multiple transmission reception points, comprising a processor; memory coupled with the processor; and instructions stored in the memory and executable by the processor to cause the apparatus to perform a method of any of aspects 1 through 11.

Aspect 21: An apparatus for wireless communications at a UE having multiple transmission reception points, comprising at least one means for performing a method of any of aspects 1 through 11.

Aspect 22: A non-transitory computer-readable medium storing code for wireless communications at a UE having multiple transmission reception points, the code comprising instructions executable by a processor to perform a method of any of aspects 1 through 11.

Aspect 23: An apparatus for wireless communications at a base station, comprising a processor; memory coupled with the processor; and instructions stored in the memory and executable by the processor to cause the apparatus to perform a method of any of aspects 12 through 19.

Aspect 24: An apparatus for wireless communications at a base station, comprising at least one means for performing a method of any of aspects 12 through 19.

Aspect 25: A non-transitory computer-readable medium storing code for wireless communications at a base station, the code comprising instructions executable by a processor to perform a method of any of aspects 12 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE) having multiple transmission reception points, the method comprising:

transmitting, to a base station, a message comprising a request for a first set of resources for sidelink communications by the UE and an indication of a self-interference measurement by the UE using the first set of resources;

receiving, from the base station, a grant scheduling the first set of resources for the UE based at least in part on the message;

measuring, in the first set of resources, self-interference between a first set of antenna components of a first transmission reception point of the UE configured for transmission and a second set of antenna components of a second transmission reception point of the UE configured for reception;

transmitting, to the base station, a sidelink feedback message comprising an indication of a second set of sidelink resources that are available for sidelink full duplex communications by the UE based at least in part on the measured self-interference;

receiving, from the base station, a second grant scheduling a third set of sidelink resources for the sidelink full duplex communications by the UE, wherein the third set of sidelink resources are at least partially overlapping with the second set of sidelink resources based at least in part on the sidelink feedback message; and performing the sidelink full duplex communications in the third set of sidelink resources based at least in part on the second grant.

2. The method of claim 1, wherein transmitting the message further comprises:

transmitting, to the base station via the message, a transmission configuration indicator state of the UE for transmission of the sidelink communications by the UE; and transmitting, to the base station via the message, a spatial receiver configuration for performing the self-interference measurement by the UE and for reception of future sidelink messages by the UE, wherein the spatial receiver configuration indicates a receive beam associated with the second transmission reception point of the UE.

3. The method of claim 1, further comprising:

receiving, from the base station, the grant indicating an accuracy of the first set of resources, wherein the first set of resources are sidelink resources and the accuracy of the first set of resources is based at least in part on scheduling information for the first set of resources and one or more other sidelink resources scheduled by the base station; and measuring the self-interference in the first set of resources based at least in part on the accuracy of the first set of resources.

4. The method of claim 3, further comprising:

transmitting, to the base station via the message, a time occasion for performing the self-interference measurement by the UE, wherein the first set of resources and the accuracy of the first set of resources are based at least in part on the time occasion.

5. The method of claim 1, further comprising:

transmitting, to the base station via the sidelink feedback message, an identifier of the UE, wherein the identifier of the UE corresponds to a destination identifier of a sidelink message for reception by the UE; and receiving, from the base station, the second grant scheduling sidelink resources for the sidelink full duplex communications by the UE based at least in part on the identifier of the UE corresponding to the destination identifier of the sidelink message for reception by the UE.

6. The method of claim 1, wherein performing the sidelink full duplex communications comprises:

receiving, from a second UE, a first sidelink message via the third set of sidelink resources, wherein the first sidelink message is received at the second transmission reception point of the UE; and transmitting, to a third UE, a second sidelink message via the third set of sidelink resources, where the second sidelink message is transmitted via the first transmission reception point of the UE.

7. The method of claim 1, further comprising:

identifying, based at least in part on a configuration for the UE, that the first set of resources comprises a sequence of channel state information reference signal resources that is configured for the self-interference measurement; and measuring the self-interference using the sequence of the channel state information reference signal resources based at least in part on the identifying.

8. The method of claim 7, wherein measuring the self-interference further comprises:

transmitting signaling via the sequence of the channel state information reference signal resources using the first transmission reception point of the UE; and measuring the self-interference based at least in part on the transmitting.

9. The method of claim 7, wherein measuring the self-interference further comprises:

transmitting, to a second UE, a self-interference measurement configuration indicating the sequence of the channel state information reference signal resources for the self-interference measurement by the UE and a set of transmission configuration indicator states for communicating with the second UE;

transmitting, to the second UE using the set of transmission configuration indicator states, signaling via the sequence of the channel state information reference signal resources;

receiving, from the second UE, a report message indicating a measured signal metric level associated with the signaling via the sequence of the channel state information reference signal resources;

updating one or more transmission configuration indication states of the set of transmission configuration indicator states for communicating with the second UE based at least in part on the measured signal metric level; and measuring the self-interference based at least in part on transmitting the signaling via the sequence of the channel state information reference signal resources.

10. The method of claim 1, further comprising:

determining that the self-interference between the first set of antenna components of the first transmission reception point of the UE configured for transmission and the second set of antenna components of the second transmission reception point of the UE configured for reception will be below a self-interference threshold for the sidelink full duplex communications in the second set of sidelink resources based at least in part on the measured self-interference; and transmitting, to the base station via the sidelink feedback message, the indication of the second set of sidelink resources based at least in part on the determining.

11. The method of claim 1, wherein the measured self-interference is based at least in part on a first reference signal receive power (RSRP) associated with a first signal transmitted via the first set of antenna components of the first transmission reception point of the UE and a second RSRP associated with a second signal received at the second set of antenna components of the second transmission reception point of the UE, the second signal based at least in part on the first signal.

12. A method for wireless communications at a base station, comprising:

receiving, from a user equipment (UE) having multiple transmission reception points, a message comprising a request for a first set of resources for sidelink communications by the UE and an indication of a self-interference measurement between the multiple transmission reception points of the UE using the first set of resources;

transmitting, to the UE, a first grant scheduling the first set of resources for the UE based at least in part on the message;

receiving, from the UE, a sidelink feedback message comprising an indication of a second set of sidelink resources that are available for sidelink full duplex communications by the UE; and transmitting, to the UE, a second grant scheduling a third set of sidelink resources for the sidelink full duplex communications by the UE based at least in part on the sidelink feedback message, wherein the third set of sidelink resources are at least partially overlapping with the second set of sidelink resources.

13. The method of claim 12, further comprising:

identifying one or more resources of the second set of sidelink resources that are available for the sidelink communications by the UE based at least in part on an interference associated with the one or more resources, wherein the third set of sidelink resources comprises the one or more resources that are available for the sidelink communications by the UE.

14. The method of claim 12, further comprising:

receiving, from the UE, the message comprising a transmission configuration indicator state of the UE for transmission of the sidelink communications and a spatial receiver configuration for the self-interference measurement by the UE and for future sidelink data reception by the UE, wherein the spatial receiver configuration indicates a receive beam associated with a transmission reception point of the UE that is configured for reception; and transmitting the first grant scheduling the first set of resources based at least in part on the transmission configuration indicator state and the spatial receiver configuration.

15. The method of claim 12, further comprising:

determining an accuracy of the first set of resources based at least in part on scheduling information for the first set of resources and one or more other sidelink resources scheduled by the base station, wherein the first set of resources are sidelink resources and the scheduling information indicates an interference associated with the first set of resources; and transmitting, to the UE, the first grant indicating the accuracy of the first set of resources based at least in part on the determining.

16. The method of claim 15, further comprising:

receiving, from the UE, the message, wherein the message indicates a time occasion for performing the self-interference measurement; and determining the accuracy of the first set of resources based at least in part on the scheduling information and the time occasion.

17. The method of claim 12, further comprising:

receiving, from the UE, the sidelink feedback message comprising an identifier of the UE;

identifying a sidelink message comprising a destination identifier that corresponds to the identifier of the UE; and scheduling, via the second grant, one or more sidelink resources of the third set of sidelink resources for transmission of the sidelink message to the UE based at least in part on the identifying.

18. The method of claim 17, wherein the one or more sidelink resources for the transmission of the sidelink message are reconfigured sidelink resources.

19. The method of claim 12, further comprising:

identifying a sequence of channel state information reference signal resources that is configured for the self-interference measurement by the UE; and transmitting, to the UE, the first grant scheduling the first set of resources for the UE, wherein the first set of resources comprise the sequence of the channel state information reference signal resources.

20. An apparatus for wireless communications at a user equipment (UE) having multiple transmission reception points, comprising:

a processor;

memory coupled with the processor; and instructions stored in the memory and executable by the processor to cause the apparatus to:

transmit, to a base station, a message comprising a request for a first set of resources for sidelink communications by the UE and an indication of a self-interference measurement by the UE using the first set of resources;

receive, from the base station, a grant scheduling the first set of resources for the UE based at least in part on the message;

measure, in the first set of resources, self-interference between a first set of antenna components of a first transmission reception point of the UE configured for transmission and a second set of antenna components of a second transmission reception point of the UE configured for reception;

transmit, to the base station, a sidelink feedback message comprising an indication of a second set of sidelink resources that are available for sidelink full duplex communications by the UE based at least in part on the measured self-interference;

receiving, from the base station, a second grant scheduling a third set of sidelink resources for the sidelink full duplex communications by the UE, wherein the third set of sidelink resources are at least partially overlapping with the second set of sidelink resources based at least in part on the sidelink feedback message; and performing the sidelink full duplex communications in the third set of sidelink resources based at least in part on the second grant.

21. The apparatus of claim 20, wherein the instructions to transmit the message are further executable by the processor to cause the apparatus to:

transmit, to the base station via the message, a transmission configuration indicator state of the UE for transmission of the sidelink communications by the UE; and transmit, to the base station via the message, a spatial receiver configuration for performing the self-interference measurement by the UE and for reception of future sidelink messages by the UE, wherein the spatial receiver configuration indicates a receive beam associated with the second transmission reception point of the UE.

22. The apparatus of claim 20, wherein the instructions are further executable by the processor to cause the apparatus to:

receive, from the base station, the grant indicating an accuracy of the first set of resources, wherein the first set of resources are sidelink resources and the accuracy of the first set of resources is based at least in part on scheduling information for the first set of resources and one or more other sidelink resources scheduled by the base station; and measure the self-interference in the first set of resources based at least in part on the accuracy of the first set of resources.

23. The apparatus of claim 22, wherein the instructions are further executable by the processor to cause the apparatus to:

transmit, to the base station via the message, a time occasion for performing the self-interference measurement by the UE, wherein the first set of resources and the accuracy of the first set of resources are based at least in part on the time occasion.

24. The apparatus of claim 20, wherein the instructions are further executable by the processor to cause the apparatus to:

transmit, to the base station via the sidelink feedback message, an identifier of the UE, wherein the identifier of the UE corresponds to a destination identifier of a sidelink message for reception by the UE; and receive, from the base station, the second grant scheduling sidelink resources for the sidelink full duplex communications by the UE based at least in part on the identifier of the UE corresponding to the destination identifier of the sidelink message for reception by the UE.

25. The apparatus of claim 20, wherein the instructions to perform the sidelink full duplex communications are executable by the processor to cause the apparatus to:

receive, from a second UE, a first sidelink message via the third set of sidelink resources, wherein the first sidelink message is received at the second transmission reception point of the UE; and transmit, to a third UE, a second sidelink message via the third set of sidelink resources, where the second sidelink message is transmitted via the first transmission reception point of the UE.

26. An apparatus for wireless communications at a base station, comprising:

a processor;

memory coupled with the processor; and instructions stored in the memory and executable by the processor to cause the apparatus to:

receive, from a user equipment (UE) having multiple transmission reception points, a message comprising a request for a first set of resources for sidelink communications by the UE and an indication of a self-interference measurement between the multiple transmission reception points of the UE using the first set of resources;

transmit, to the UE, a first grant scheduling the first set of resources for the UE based at least in part on the message;

receive, from the UE, a sidelink feedback message comprising an indication of a second set of sidelink resources that are available for sidelink full duplex communications by the UE; and transmit, to the UE, a second grant scheduling a third set of sidelink resources for the sidelink full duplex communications by the UE based at least in part on the sidelink feedback message, wherein the third set of sidelink resources are at least partially overlapping with the second set of sidelink resources.

27. The apparatus of claim 26, wherein the instructions are further executable by the processor to cause the apparatus to:

identify one or more resources of the second set of sidelink resources that are available for the sidelink communications by the UE based at least in part on an interference associated with the one or more resources, wherein the third set of sidelink resources comprises the one or more resources that are available for the sidelink communications by the UE.

28. The apparatus of claim 26, wherein the instructions are further executable by the processor to cause the apparatus to:

receive, from the UE, the message comprising a transmission configuration indicator state of the UE for transmission of the sidelink communications and a spatial receiver configuration for the self-interference measurement by the UE and for future sidelink data reception by the UE, wherein the spatial receiver configuration indicates a receive beam associated with a transmission reception point of the UE that is configured for reception; and transmit the first grant scheduling the first set of resources based at least in part on the transmission configuration indicator state and the spatial receiver configuration.

29. The apparatus of claim 26, wherein the instructions are further executable by the processor to cause the apparatus to:

determine an accuracy of the first set of resources based at least in part on scheduling information for the first set of resources and one or more other sidelink resources scheduled by the base station, wherein the first set of resources are sidelink resources and the scheduling information indicates an interference associated with the first set of resources; and transmit, to the UE, the first grant indicating the accuracy of the first set of resources based at least in part on the determining.

30. The apparatus of claim 29, wherein the instructions are further executable by the processor to cause the apparatus to:

receive, from the UE, the message, wherein the message indicates a time occasion for performing the self-interference measurement; and determine the accuracy of the first set of resources based at least in part on the scheduling information and the time occasion.

* * * * *